(12) United States Patent
Goodrich et al.

(10) Patent No.: US 10,987,941 B2
(45) Date of Patent: Apr. 27, 2021

(54) DIRECT WRITE THREE-DIMENSIONAL PRINTING OF ALIGNED COMPOSITE MATERIALS

(71) Applicant: Northeastern University, Boston, MA (US)

(72) Inventors: Scott Goodrich, Hamilton, MA (US); Andrew Caunter, Hampton Falls, NH (US); Daniel Shores, Georgetown, MA (US); Ryan Pembroke, Bennington, VT (US); Amy Den Dulk, Boston, MA (US); Randall Erb, Newton, MA (US)

(73) Assignee: Northeastern University, Boston, MA (US)

( * ) Notice: Subject to any disclaimer, the term of this patent is extended or adjusted under 35 U.S.C. 154(b) by 211 days.

(21) Appl. No.: 15/781,760

(22) PCT Filed: Dec. 7, 2016

(86) PCT No.: PCT/US2016/065310
§ 371 (c)(1),
(2) Date: Jun. 6, 2018

(87) PCT Pub. No.: WO2017/100271
PCT Pub. Date: Jun. 15, 2017

(65) Prior Publication Data
US 2019/0263060 A1    Aug. 29, 2019

Related U.S. Application Data

(60) Provisional application No. 62/264,290, filed on Dec. 7, 2015.

(51) Int. Cl.
*B41J 2/43* (2006.01)
*B33Y 10/00* (2015.01)
(Continued)

(52) U.S. Cl.
CPC ............ *B41J 2/43* (2013.01); *B28B 17/02* (2013.01); *B29C 64/118* (2017.08);
(Continued)

(58) Field of Classification Search
CPC ................. B29C 64/209; B41J 2/43
See application file for complete search history.

(56) References Cited

U.S. PATENT DOCUMENTS 4,575,330 A   3/1986  Hull
5,755,272 A   5/1998  Mortensen et al.
(Continued)

FOREIGN PATENT DOCUMENTS

AU   2013100794   *  7/2013
CN   101778713 A      7/2010
(Continued)

OTHER PUBLICATIONS

Mouritz, A.P. et al., "Review of applications for advanced three-dimensional fibre textile composites", Composites Part A: Applied Science and Manufacturing, vol. 30, Issue 12, 1999, pp. 1445-1461, ISSN 1359-835X, (sciencedirect.com/science/article/pii/S1359835X99000342) doi.org/10.1016/S1359-835X(99)00034-2.
(Continued)

*Primary Examiner* — Jacob T Minskey
*Assistant Examiner* — Adrien J Bernard
(74) *Attorney, Agent, or Firm* — Verrill Dana, LLP

(57) ABSTRACT

An apparatus and method for producing a composite part, such as a reinforced composite part, are provided that enable control over the fiber or other particle orientation within each layer of the part during manufacture. The apparatus and method employ a print head including a dispensing tip and a magnetic assembly controllable to apply a magnetic field at a print location adjacent the dispensing tip outlet.

20 Claims, 22 Drawing Sheets

(51) Int. Cl.

| | | |
|---|---|---|
| *B33Y 30/00* | (2015.01) | |
| *B33Y 50/02* | (2015.01) | |
| *B33Y 70/00* | (2020.01) | |
| *B29C 64/209* | (2017.01) | |
| *B29C 64/393* | (2017.01) | |
| *B29C 64/165* | (2017.01) | |
| *B29C 70/14* | (2006.01) | |
| *B29C 70/62* | (2006.01) | |
| *B29C 67/00* | (2017.01) | |
| *B28B 17/02* | (2006.01) | |
| *B29C 64/118* | (2017.01) | |
| *B29K 101/12* | (2006.01) | |
| *B29K 305/00* | (2006.01) | |

(52) U.S. Cl.
CPC .......... *B29C 64/165* (2017.08); *B29C 64/209* (2017.08); *B29C 64/393* (2017.08); *B29C 67/00* (2013.01); *B29C 70/14* (2013.01); *B29C 70/62* (2013.01); *B33Y 10/00* (2014.12); *B33Y 30/00* (2014.12); *B33Y 50/02* (2014.12); *B33Y 70/00* (2014.12); *B29K 2101/12* (2013.01); *B29K 2305/00* (2013.01)

(56) References Cited

U.S. PATENT DOCUMENTS

| | | | |
|---|---|---|---|
| 8,475,703 | B2 | 7/2013 | Turng et al. |
| 2004/0151978 | A1 | 8/2004 | Huang |
| 2005/0161119 | A1 | 7/2005 | McKnight et al. |
| 2010/0143668 | A1 | 6/2010 | Farmer et al. |
| 2011/0175259 | A1 | 7/2011 | Turng et al. |
| 2013/0053471 | A1 | 2/2013 | Studart et al. |
| 2013/0056672 | A1 | 3/2013 | Johnston et al. |
| 2013/0090405 | A1 | 4/2013 | Elimelech et al. |
| 2015/0022298 | A1 | 1/2015 | Fullerton |
| 2015/0024141 | A1 | 1/2015 | Shukla |
| 2015/0183138 | A1 | 7/2015 | Duty et al. |
| 2015/0273577 | A1 | 10/2015 | Vader et al. |
| 2017/0092400 | A1* | 3/2017 | Bharadwaj .......... H01F 41/0253 |

FOREIGN PATENT DOCUMENTS

| | | |
|---|---|---|
| CN | 102963002 A | 3/2013 |
| EP | 0403166 A2 | 12/1990 |
| EP | 2565022 A1 | 3/2013 |
| WO | 2011120643 A2 | 10/2011 |
| WO | 2015188175 A1 | 12/2015 |

OTHER PUBLICATIONS

Bonderer, LJ et al., "Bioinspired design and assembly of platelet reinforced polymer films.", Science. Feb. 22, 2008; vol. 319, Issue 5866: pp. 1069-1073. doi: 10.1126/science.1148726.

Erb, R. M. et al., "Temporal response of magnetically labeled platelets under dynamic magnetic fields", Soft Matter, 2013, 9, pp. 498-505. DOI: 10.1039/C2SM26910D.

Erb, R. M. et al., "Composites Reinforced in Three Dimensions by Using Low Magnetic Fields", Science, Jan. 13, 2012: vol. 335, Issue 6065, pp. 199-204 DOI: 10.1126/science.1210822.

Kokkinis, Dimitri et al., "Multimaterial magnetically assisted 3D printing of composite materials", Nature Communications vol. 6, Article number: 8643 (2015) doi.org/10.1038/ncomms9643.

Lewis, J. et al., "Direct writing in three dimensions", MaterialsToday, vol. 7, Issues 7-8, Jul.-Aug. 2004, pp. 32-39. doi.org/10.1016/51369-7021(04)00344-X.

Mahajan, Chaitanya "Aligning Carbon Fibers in Micro-Extruded Composite Ink" (2014) Thesis. Rochester Institute of Technology.

Martin, J. J. et al., "Designing bioinspired composite reinforcement architectures via 3D magnetic printing", Nature Communications, 6, Article No. 8641 (2015) doi: 10.1038/ncomms9641.

Martin, J. J. et al., "Understanding and overcoming shear alignment of fibers during extrusion", SoftMatter. 2015, vol. 11, Issue 2, pp. 400-405. doi: 10.1039/C4SM02108H The Royal Society of Chemistry.

Shubhra, Quazi TH et al., "Mechanical properties of polypropylene composites A review", Journal of Thermoplastic Composite Materials, Apr. 2013, vol. 26, pp. 362-391. doi: 10.1177/0892705711428659.

Tay, T. E. et al., "Progressive Failure Analysis of Composites", Journal of Composite Materials, vol. 42, No. 18/ 2008.

Vaidya, U. K. et al., "Processing of fibre reinforced thermoplastic composites.", International Materials Reviews, vol. 53, No. 4, pp. 185-218, (2008) Taylor & Francis. doi: 10.1179/174328008X325223 ISSN: 0950-6608.

Wegst, Ulrike G. K. et al., "Bioinspired structural materials", Nature Materials, Oct. 2014, vol. 14(1), pp. 23-36, doi: 10.1038/NMAT4089.

Compton, Brett G. et al., "3D-printing of lightweight cellular composites.", Advanced Materials, Sep. 10, 2014;vol. 26 (34):5930-5935. doi: 10.1002/adma.201401804.

Dimas, Leon S. et al., "Tough Composites Inspired by Mineralized Natural Materials: Computation, 3D printing, and Testing", Advanced Functional Materials, (2013) vol. 23, No. 36, pp. 4629-4638. doi: 10.1002/adfm.201300215.

\* cited by examiner

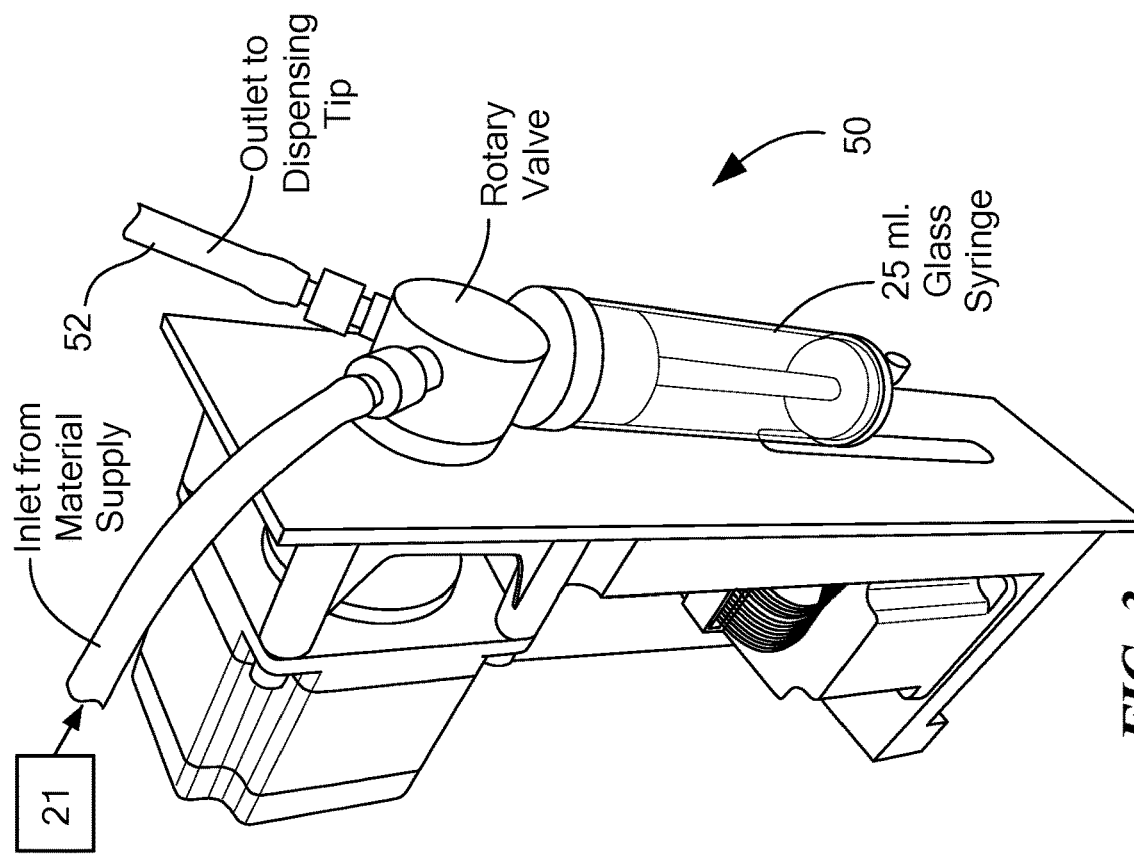

Extrusion location

41 Clearance plane

43 Extended tapered core

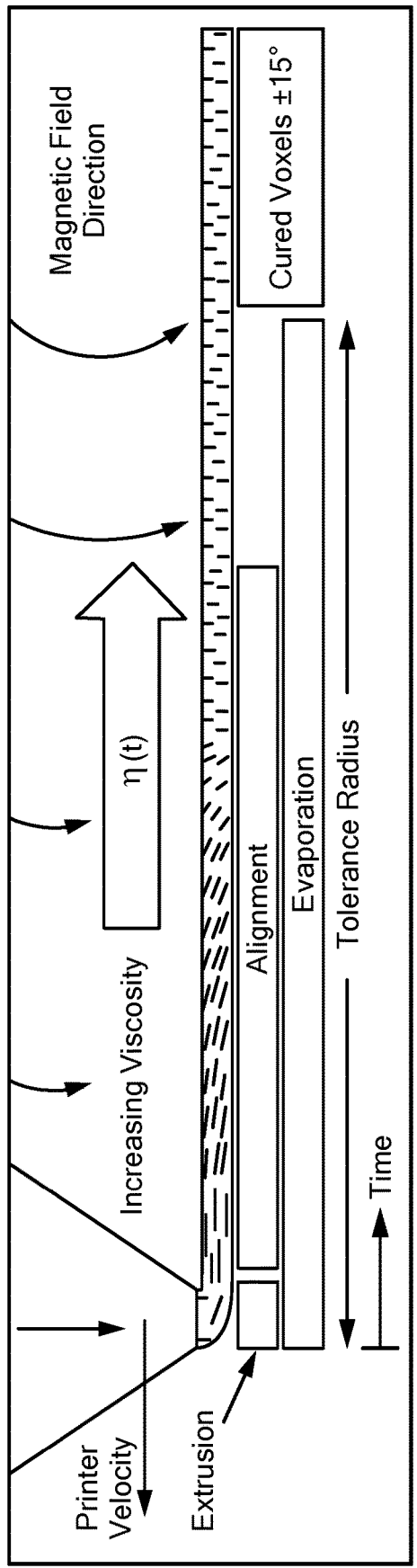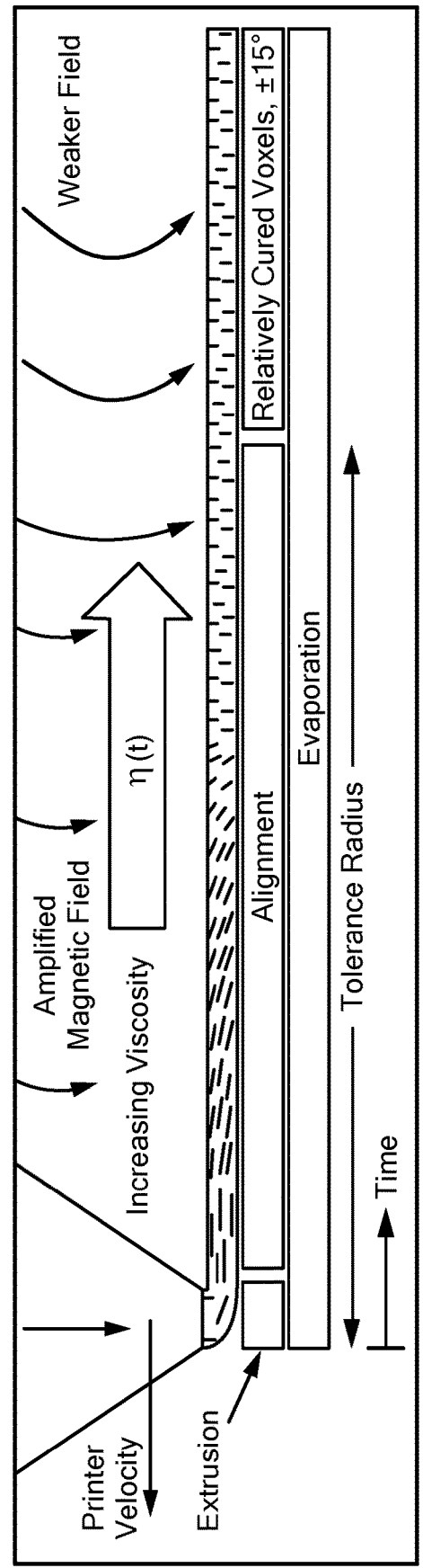
FIG. 24
FIG. 25

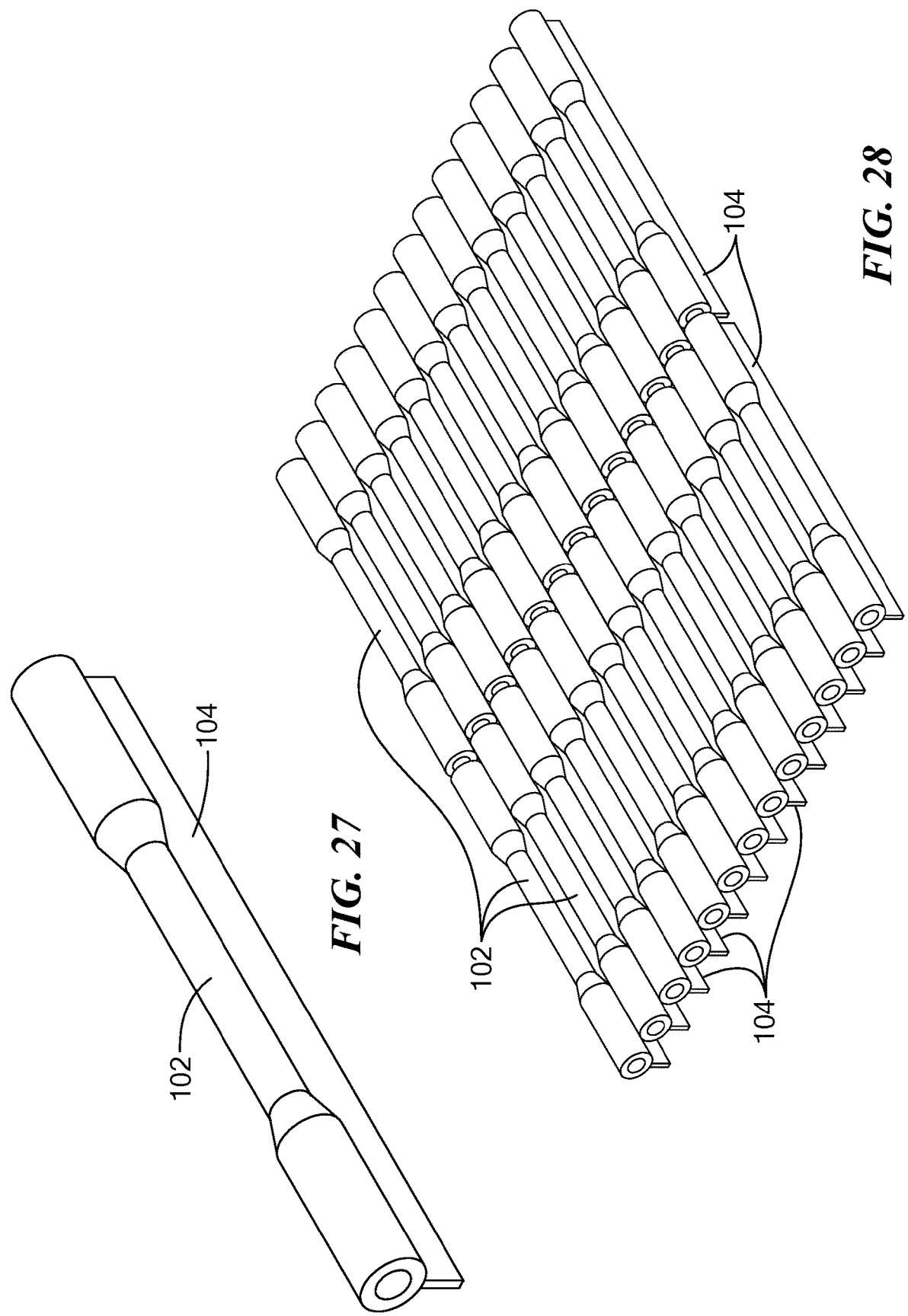

US 10,987,941 B2

DIRECT WRITE THREE-DIMENSIONAL PRINTING OF ALIGNED COMPOSITE MATERIALS

CROSS REFERENCE TO RELATED APPLICATIONS

This application claims priority under 35 § 119(e) of U.S. Provisional Application No. 62/264,290, filed on Dec. 7, 2015, entitled "Direct Write Three-Dimensional Printing of Aligned Composite Materials," the disclosure of which is hereby incorporated by reference.

STATEMENT REGARDING FEDERALLY SPONSORED RESEARCH OR DEVELOPMENT

N/A

BACKGROUND

Direct-write 3D printing is an additive manufacturing process in which volumetric pixels (voxels) are deposited from a nozzle to form layers. The part is then built up layer by layer. There are many different types of 3D printing, each with its own benefits and limitations. For example, laser sintering and stereolithographic printing use directed energy with a laser or UV source to cure the material solution. Direct-write printing coordinates the extrusion rate of a viscous liquid solution with the relative X, Y and Z movement between the extrusion nozzle and printing location. Additionally, direct write printing is compatible with many different materials at relatively low costs for low volume production, and is often used as a prototyping method in product development. The most comparable technology to direct write 3D printing is fused filament fabrication (FFF), which uses the same process of extruding a material through a nozzle.

Direct-write 3D printing offers many advantages over FFF. The biggest advantage is that some direct-write materials can be printed at room temperature. FFF requires its material to be heated up to the material's melting point before it can be extruded. After the material is heated, it cools rapidly. As the material cools, it contracts, which can lead to warping issues. Warping is a major issue with FFF printing, which must be corrected with either a heated bed or heated build chamber. Direct-write materials printed at room temperature do not experience the same warping effect. FFF parts are weakest in the Z-axis because the layers do not bond well to each other. Poorly bonded layers can also lead to layer delamination, where the layers separate from each other, leading to weaker parts. Materials printed at room temperature utilize a solvent, and cure as that solvent evaporates. As a layer is deposited on top of another layer, some of the solvent from the newly deposited material penetrates the layer below it. This allows the newly deposited material to form a bond with the layer below it. This leads to stronger parts that are air and water tight. Direct-write printing is also cheaper than FFF printing because it does not require heating elements.

A method and apparatus for the additive manufacturing of discontinuous fiber composites using magnetic fields is described in WO 2015/188175. Magnetic fields are applied during various additive manufacturing processes to achieve complex particle orientations within each layer of a part.

SUMMARY OF THE INVENTION

The invention relates to an apparatus and method for producing a composite part, such as a reinforced composite part, that enable control over the particle orientation within each layer of the part. The apparatus and method employ a print head including a dispensing tip and magnetic assembly to controllable to apply a magnetic field at a print location or print voxel adjacent the dispensing tip outlet.

Other aspects of the method and system include the following:

1. An apparatus for producing a composite part, comprising:
a print head comprising a dispensing tip having an outlet, and a magnetic assembly controllable to apply a magnetic field in a desired magnetic field direction and having a desired magnetic field strength at a print location adjacent to the outlet of the dispensing tip;
a pump in fluid communication with the dispensing tip to provide a magnetically responsive precursor material to the dispensing tip;
a bed disposed below the outlet of the dispensing tip to receive the magnetically responsive precursor material at the print location, the print head and the bed movable in three dimensions relative to each other; and
one or more processors and memory, and machine-readable instructions stored in the memory that, upon execution by the one or more processors, cause the apparatus to carry out operations comprising controlling the magnetic assembly to apply the magnetic field in the desired direction and with the desired strength at the print location.

2. The apparatus of embodiment 1, wherein the magnetic assembly comprises three mutually orthogonally arranged solenoid magnets having a point of origin at the print location, and the processor is operative to execute instructions to control a magnitude and polarity of current through each solenoid magnet to apply the magnetic field in the desired direction and with the desired strength.

3. The apparatus of embodiment 2, wherein each solenoid magnet has a core with a central neutral axis and includes a central material with a first magnetic permeability aligned on the neutral axis and a spacer material with a second magnetic permeability less than the first magnetic permeability coaxially surrounding the central material.

4. The apparatus of embodiment 3, wherein the second magnetic permeability is about equal to a magnetic permeability in air.

5. The apparatus of any of embodiments 2-4, wherein each solenoid magnet includes a core filled with a soft magnetic material.

6. The apparatus of embodiment 5, wherein the soft magnetic material is iron, a low carbon steel, supermalloy, an iron-silicon alloy, an iron-aluminum-silicon alloy, a nickel-iron alloy, an iron-cobalt alloy, a ferrite, an amorphous alloy, or a ferrous alloy powder.

7. The apparatus of embodiment 6, wherein each solenoid magnet includes a core, and a material with a magnetic permeability is disposed in the core and extends above, below, or above and below solenoid end faces.

8. The apparatus of any of embodiments 2-7, wherein each solenoid forms a bridge of a circuit in electrical communication with a DC power supply.

9. The apparatus of embodiment 8, wherein the processor is operative to execute instructions to subject the circuit to pulse width modulation to control current flow through the solenoid.

10. The apparatus of any of embodiments 8-9, wherein the processor is operative to execute instructions to switch the circuit to change the polarity of current flow through the solenoid.

11. The apparatus of any of embodiments 8-10, wherein the processor is operative to execute instructions to pulse current through the solenoids to apply magnetic fields with two alternating perpendicular field directions at the print location.

12. The apparatus of any of embodiments 1-11, wherein the processor is operative to execute instructions to provide a rotating magnetic field at the print location.

13. The apparatus of embodiment 1, wherein the magnetic assembly comprises one or more permanent magnets having a point of origin at the print location.

14. The apparatus of any of embodiments 1 and 13, wherein the magnetic assembly comprises a ferromagnetic material.

15. The apparatus of any of embodiments 1 and 13-14, wherein the magnetic assembly comprises one or more magnets of a magnetic material, wherein the magnetic material is iron, an iron alloy, cobalt, a cobalt alloy, nickel, a nickel alloy, a manganese compound, or a rare earth material.

16. The apparatus of any of embodiments 1-15, wherein the processor is operative to control the magnetic assembly, the pump, and the motion of the bed relative to the print head based on a viscosity of the precursor material.

17. The apparatus of any of embodiments 1-16, wherein the processor is operative to control the magnetic assembly, the pump, and the motion of the bed relative to the print head to cause the magnetically responsive precursor material to align with the magnetic field within an alignment zone, and to allow the precursor material to cure sufficiently to maintain the magnetically responsive precursor material in alignment outside of the alignment zone 18. The apparatus of any of embodiments 1-17, wherein the processor is operative to maintain the alignment outside of the alignment zone within about ±15° of the magnetic field at the print location.

19. The apparatus of any of embodiments 1-18, wherein the processor is operative to execute instructions to control a flow rate of the pump, to start the pump, and to stop the pump.

20. The apparatus of any of embodiments 1-19, wherein the processor is operative to execute instructions to move one or both of the print head and the bed.

21. The apparatus of any of embodiments 1-20, further comprising cooling channels in the print head disposed to circulate a cooling fluid about the magnetic assembly.

22. The apparatus of embodiment 21, wherein the cooling fluid is compressed air or water.

23. The apparatus of any of embodiments 1-22, wherein the print head is movable in a vertical direction and the bed is movable in a horizontal plane.

24. The apparatus of any of embodiments 1-22, wherein the print head is movable in three dimensions.

25. The apparatus of any of embodiments 1-22, wherein the bed is movable in three dimensions.

26. The apparatus of any of embodiments 1-22, wherein the print head is movable in a horizontal plane and the bed is movable in a vertical direction.

27. The apparatus of any of embodiments 1-26, wherein the outlet of the dispensing tip has a diameter of about 250 microns or less.

28. The apparatus of any of embodiments 1-27, wherein the outlet of the dispensing tip has a diameter of about 200 microns or less.

29. The apparatus of any of embodiments 1-28, wherein the outlet of the dispensing tip has a diameter of about 150 microns or less.

30. The apparatus of any of embodiments 1-29, wherein the outlet of the dispensing tip has a diameter of about 100 microns or less.

31. The apparatus of any of embodiments 1-30, wherein the outlet of the dispensing tip has a diameter of about 50 microns or less.

32. The apparatus of any of embodiments 1-31, wherein the pump comprises a syringe pump.

33. The apparatus of any of embodiments 1-32, wherein the pump includes an inlet in fluid communication with one or more precursor material sources and an outlet, separate from the inlet, in fluid communication with the dispensing tip.

34. The apparatus of any of embodiments 1-33, wherein the pump is operable to pump the precursor material at a flow rate of about 100 mL/hr or less.

35. The apparatus of any of embodiments 1-34, wherein the pump is operable to pump the precursor material at a flow rate of about 0.01 mL/hr to about 100 mL/hr 36. The apparatus of any of embodiments 1-35, wherein the pump is operable to pump the precursor material at a flow rate of about 0.1 mL/hr to about 10 mL/hr.

37. The apparatus of any of embodiments 1-36, wherein the pump is operable to pump the precursor material at a flow rate of about 0.1 mL/hr to about 1 mL/hr.

38. The apparatus of any of embodiments 1-37, wherein the pump is operable to pump the precursor material with a volume accuracy of about ±1%.

39. The apparatus of any of embodiments 1-38, wherein the pump is operable to pump the precursor material with a volume accuracy of about ±0.5%.

40. The apparatus of any of embodiments 1-39, further comprising a source of the magnetically responsive precursor material, wherein the magnetically responsive precursor material comprises a matrix material and magnetically responsive particles comprising at least in part a magnetic material.

41. The apparatus of embodiment 40, wherein the magnetic material comprises a ferromagnetic material, a paramagnetic material, a superparamagnetic material, iron oxide, iron, cobalt, nickel, an iron alloy, a cobalt alloy, or a nickel alloy.

42. The apparatus of any of embodiments 40-41, wherein the magnetic material comprises particles, microbeads, nanoparticles, filing, fibers, flakes, rods, whisker, or platelets.

43. The apparatus of any of embodiments 40-42, wherein the magnetically responsive particles are anisotropic in shape in at least one dimension.

44. The apparatus of any of embodiments 40-43, wherein the magnetically responsive particles have a longest dimension ranging from 200 nm to 1000 μm.

45. The apparatus of any of embodiments 40-44, wherein the magnetically responsive particles have an aspect ratio ranging from 2 to 200.

46. The apparatus of any of embodiments 40-45, wherein the magnetically responsive particles comprise a non-magnetic material coupled with the magnetic material.

47. The apparatus of embodiment 46, wherein the non-magnetic material comprises aluminum oxide, calcium phosphate, copper, glass, calcium sulfate, nylon, polystyrene, or silicon carbide.

48. The apparatus of any of embodiments 46-47, wherein the non-magnetic material comprises discontinuous fibers, rods, platelets, flakes, or whiskers.

49. The apparatus of any of embodiments 46-48, wherein the non-magnetic material is coated with the magnetic material.

50. The apparatus of any of embodiments 40-49, wherein the matrix material is a thermoplastic polymer, polyurethane, silicone, acrylic, acrylonitrile butadiene styrene, nylon, poly lactic acid, polycarbonate, polyethylene, polypropylene, polystyrene, polyvinyl chloride, polytetrafluoroethylene, collagen, gelatin, or alginate.

51. The apparatus of any of embodiments 40-45, wherein the precursor material includes a solvent.
52. The apparatus of any of embodiments 1-51, wherein the precursor material is curable in air.
53. The apparatus of any of embodiments 1-52, wherein the precursor material is curable at room temperature.
54. A method for producing a composite part, comprising:
dispensing a precursor material through a dispensing tip onto a bed while moving the dispensing tip and the bed relative to each other, the precursor material comprising a matrix material and magnetically responsive particles, the magnetically responsive particles comprising at least in part a magnetic material;
applying a magnetic field in a desired direction and having a desired strength at a print location adjacent to an outlet of the dispensing tip to align the magnetically responsive particles within an alignment zone on the bed;
allowing the precursor material to cure to maintain the magnetically responsive particles in an aligned position outside of the alignment zone.
55. The method of embodiment 54, further comprising controlling the steps of dispensing the precursor material and applying the magnetic field so that a viscosity of the precursor material while within the alignment zone remains sufficiently low to allow alignment of the magnetically responsive particles.
56. The method of any of embodiments 54-55, wherein applying the magnetic field comprises providing a magnetic assembly comprising three mutually orthogonally arranged solenoid magnets having a point of origin within the print location and controlling a magnitude and polarity of current through each solenoid to apply the magnetic field in the desired direction and with the desired strength.
57. The method of embodiment 56, calculating an electrical current for each solenoid to create a desired resultant magnetic field at the print location.
58. The method of any of embodiments 56-57, wherein each solenoid forms a bridge of a circuit in electrical communication with a DC power supply, and further comprising applying pulse width modulation to control current flow through each solenoid.
59. The method of any of embodiments 56-58, wherein each solenoid forms a bridge of a circuit in electrical communication with a DC power supply, and further comprising the step of switching one or more of the circuits to change the polarity of current flow through the solenoid.
60. The method of any of embodiments 56-59, further comprising pulsing current through one or more of the solenoids to apply magnetic fields with two alternating perpendicular field directions at the print locations.
61. The method of any of embodiments 54-60, further comprising applying a rotating magnetic field at the print location.
62. The method of any of embodiments 54-61, further comprising amplifying the strength of the magnetic field within the alignment zone.
63. The method of any of embodiments 54-62, wherein within the alignment zone, the direction of the magnetic field is within ±15° of a desired direction.
64. The method of any of embodiments 54-63, further comprising moving one of the bed and the dispensing tip vertically to dispense precursor material in a second layer vertically adjacent to a first layer.
65. The method of any of embodiments 54-64, pumping the precursor material through the dispensing tip at a flow rate of 10 mL/hr or less with a volume accuracy of ±1%.
66. The method of any of embodiments 54-65, further comprising selecting a viscosity of the precursor material, a speed of the dispensing tip relative to the bed, and a magnetic field strength to allow the magnetically responsive particles to align within the alignment zone and the precursor material to cure sufficiently to retain the magnetically responsive particles in an aligned position outside of the alignment zone.

DESCRIPTION OF THE DRAWINGS

The invention will be more fully understood from the following detailed description taken in conjunction with the accompanying drawings in which:

FIG. 2 is an illustration of a print head of the apparatus of FIG. 1;

FIG. 3 is an illustration of a pump of the apparatus of FIG. 1;

FIG. 24 is a schematic illustration of an embodiment of system parameters for magnetic fiber alignment;

FIG. 25 is a schematic illustration of a further embodiment of system parameters for magnetic fiber alignment in a localized magnetic field;

FIG. 27 is an isometric view of an embodiment of a three-dimensional printed catheter printed in a horizontal orientation;

FIG. 28 is an isometric view of a plurality of three-dimensional printed catheters printed in a horizontal orientation;

DETAILED DESCRIPTION OF THE INVENTION

Discontinuous fiber composites represent a class of materials that are strong, lightweight and have remarkable fracture toughness. A challenge to adapting additive manufacturing technology to discontinuous fiber-reinforced composites is the ability to control the orientation of fibers during the printing process. A fiber aligned with the applied stress reinforces the encompassing matrix, while an orthogonal fiber acts as a defect, weakening the polymer matrix. Randomized fibers (standard for systems without control) perform in the region between these two extremes resulting in negligibly impacting composite strength while severely sacrificing ductility.

An apparatus and method for producing a composite part, such as a reinforced composite part, are provided that enable control over the fiber or other particle orientation within each layer of the part during manufacture.

Figure 1:
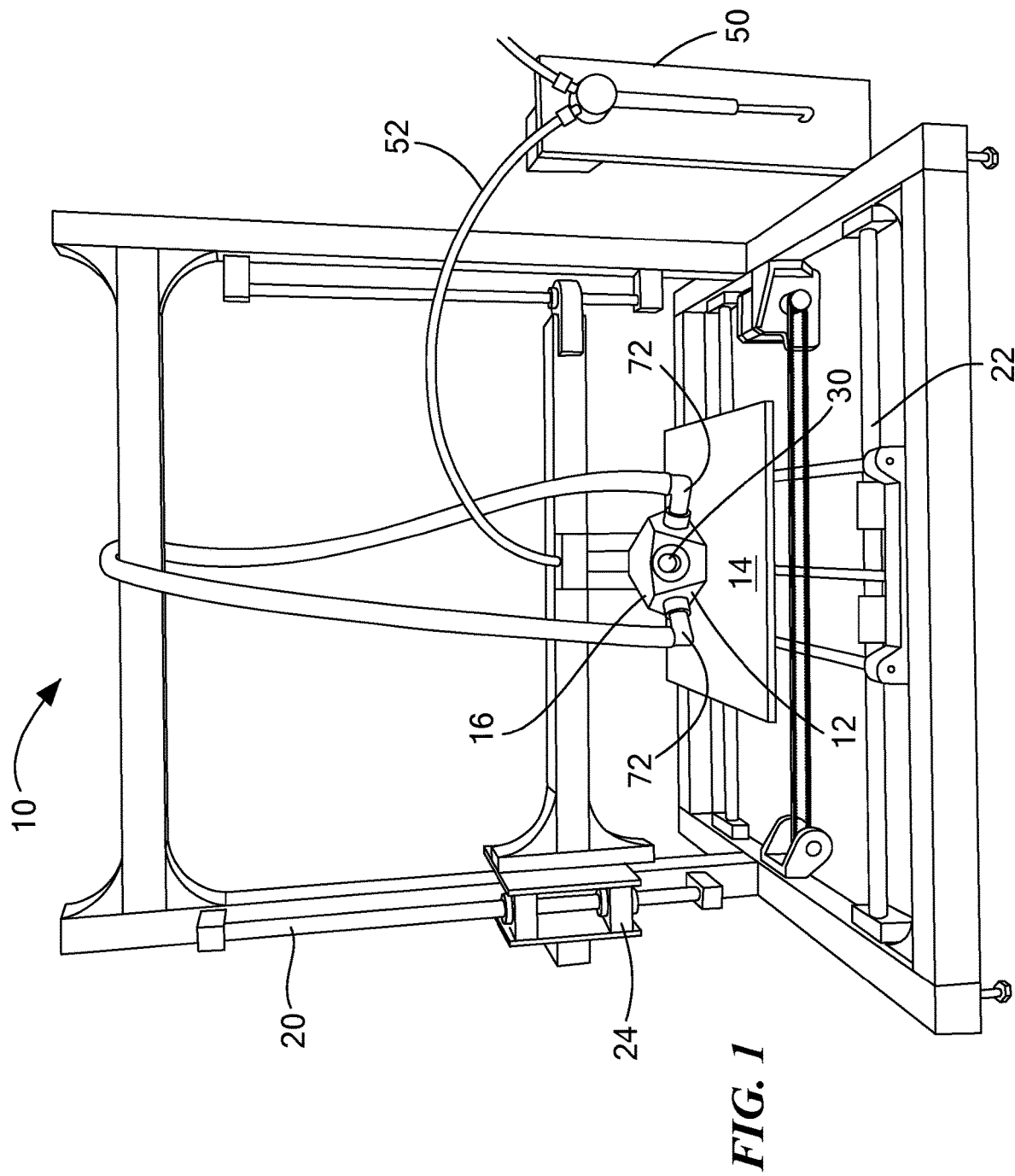
FIG. 1 is an illustration of an embodiment of an apparatus for producing a composite part.
Figure 4:
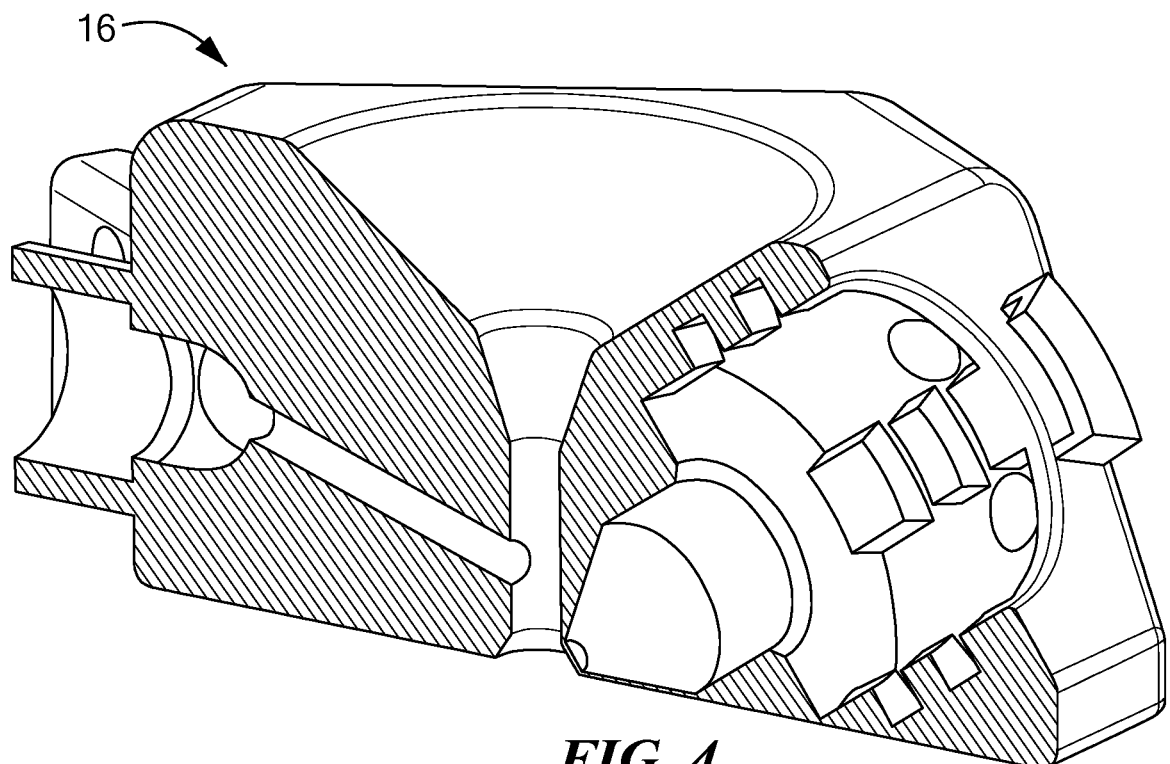
FIG. 4 is a schematic illustration of a support block of a print head.
Figure 5:
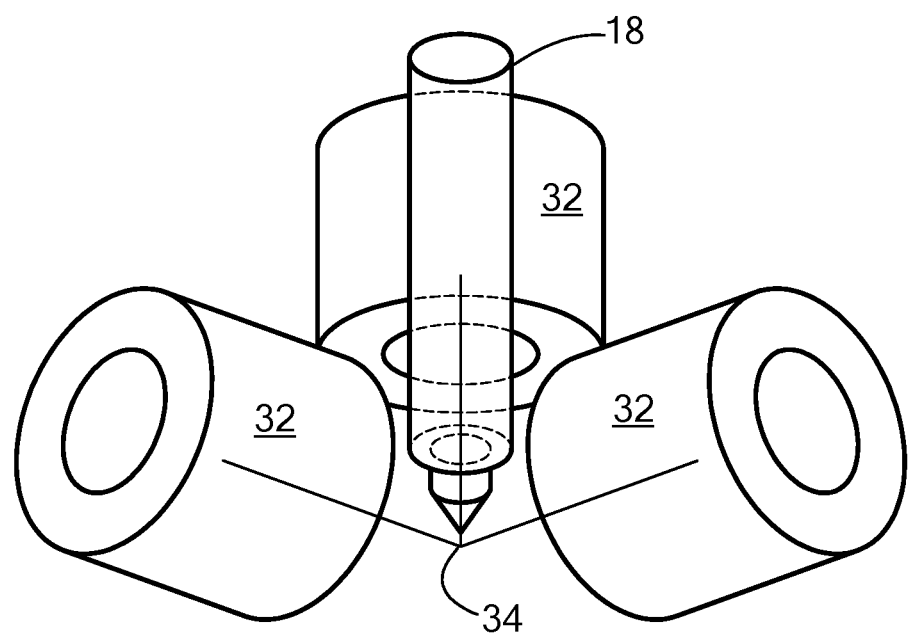
FIG. 5 is a schematic illustration of a magnetic assembly in a mutually orthogonal alignment.
Figure 6:
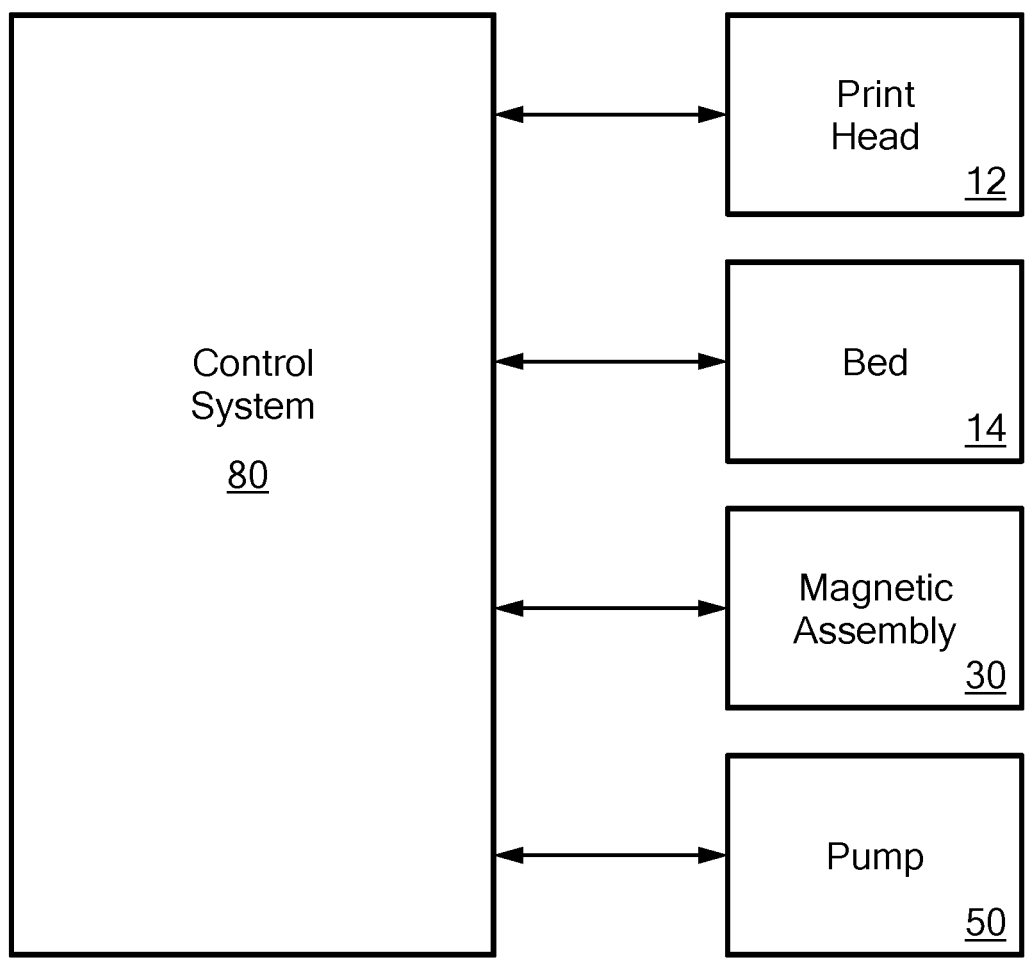
FIG. 6 is a block diagram of a control system for the apparatus of FIG. 1.

An embodiment of an apparatus 10 is illustrated with reference to FIGS. 1-3. The apparatus has a print head 12 and a bed 14 that are movable relative to each other in three dimensions. The print head and bed can be mounted to a frame 20 for relative movement, described further below. The print head includes a support block 16 that supports a dispensing tip 18 and a magnetic assembly 30. The dispensing tip 18 is in fluid communication with a pump 50, and the pump is in fluid communication with a source of a magnetically responsive precursor material in liquid form. The pump is controllable to pump the precursor material to the print head, where it is dispensed through an outlet of the dispensing tip onto a print location or print voxel on the bed below the dispensing tip.

The magnetically responsive precursor material is a curable material including a matrix material and magnetically responsive particles comprising at least in part a magnetic material. In some embodiments, the magnetic assembly includes one magnet, two magnets, or three magnets. In some embodiments, the magnetic assembly 30 includes three mutually orthogonally arranged magnets 32 having a point of origin 34 at the print location or print voxel. In some embodiments, one or more magnets of the magnetic assembly can be movable. The magnetic assembly in the print head is controllable to apply a magnetic field in a desired magnetic field direction and with a desired magnetic field strength at the print location. In this manner, the magnetically responsive particles at the print location align with the applied magnetic field at the print location. As the dispensed material moves away from the dispensing tip, the material cures, fixing the magnetically responsive particles in the aligned position.

A computer-implemented control system 80 is in communication with the print head 12, the bed 14, the magnetic assembly 30, and the pump 50 to control the dispensing of the precursor material at an appropriate flow rate, to apply a magnetic field of the appropriate direction and strength to align the magnetically responsive particles in a desired orientation and to move the dispensing tip and bed relative to each other.

The print head 12 and the bed 14 are movable relative to each other, for example, along three orthogonal axes, and X axis, Y axis, and Z axis. The apparatus frame 20 can include any suitable motion stage 22 to provide the relative motion between the print head and the bed.

In some embodiments, the print head 12 can be mounted on the frame for vertical movement along the Z axis. A lead screw mechanism 24 can be used to provide the vertical motion. Other linear motion mechanisms can be used to provide vertical movement. The bed can be mounted on a stage for movement in a horizontal plane, along the X and Y axes. Any suitable motor or motors can be used to control the motions. Other elements, such as coupling belts, rods, bearings, and the like, can be used.

Any suitable pump 50 can be used. The pump is selected to provide precise and consistent fluid control of a precursor material from a source to the dispensing tip where the material can be dispensed in small, precise quantities. In some embodiments, the pump can be mounted to the frame of the apparatus, such as to a side of a static vertical support member. Any suitable tubing 52 can be used to carry the fluid from the pump to the dispensing tip. In some embodiments, the tubing can be a semi-stiff plastic tubing that can allow for shifting and bending caused by Z-axis movement of the dispensing tip while preventing sharp bends and/or kinking. Excessive bending can affect the volume between the pump and the dispensing tip, leading to inconsistent flow from the printer head.

In some embodiments, the dispensing tip 18 can be a metal or plastic Luer lock tapered disposable nozzle. In some embodiments, the nozzle can have an inner diameter of about 100 to about 250 microns (about 0.004 inch to about 0.010 inch). In some embodiments, the nozzle can have an inner diameter of about 50 microns. In some embodiments, the dispensing tip can have a straight dispensing nozzle.

In some embodiments, the pump 50 can be a syringe pump. A syringe pump can provide consistent flow and can handle low volumetric flow rates. Syringe pumps include a drive mechanism that pushes and pulls a syringe plunger within a syringe tube to dispense and aspirate fluid, respectively. In some embodiments, the drive mechanism can include a stepper motor that turns a lead screw which drives a linear slide and the syringe plunger.

In some embodiments, the pump can dispense fluid at a flow rate between 0.01 mL/hr to 100 mL/hr. In some embodiments, the pump can dispense fluid at a flow rate between 0.1 mL/hr to 10 mL/hr. In some embodiments, the pump can dispense fluid at a flow rate between 0.1 mL/hr to 1 mL/hr. In some embodiments, the pump can dispense fluid in small quantities on the order of 10 mL/hr or less. In some embodiments, the pump can dispensed fluids with a volume accuracy of 1%, and in some embodiments, with a volume accuracy of 0.5%. Volume accuracy as used herein means that the actual volume dispensed is within a desired percentage of an anticipated or desired volume.

In some embodiments, a pump syringe size is about 50 mL (50 cm$^3$). In some embodiments, a pump syringe size is about 25 mL. In some embodiments, a pump syringe size is about 1 mL. Other syringe sizes can be used. Flow rate is dependent on the linear velocity of the plunger. Larger syringe diameters can prevent some pumps from pumping at or below a particular flow rate threshold, such as a 10 mL/hr threshold. In some embodiments, a pump can have the ability to aspirate (withdraw) the plunger in order to refill a syringe in between layer builds. In some embodiments, a pump can have a motorized rotary valve to allow the pump to refill the syringe in between build layers without the removal of the dispensing tip form the printing head.

The pump can be programmable or controllable to receive instructions to start and stop pumping and to change flow rate, as necessary for a particular application. The flow rate and timing of the pumping can be coordinated with the relative motion of the print head and bed so that the precursor material can be dispensed at an appropriate rate to allow for curing after the magnetically responsive particles have aligned with the applied magnetic field.

As noted above, a control system 80 is in communication with the print head, the magnetic assembly, the pump, and the bed to control the dispensing of the precursor material at the appropriate rate and to apply a magnetic field of the appropriate direction and strength. In some embodiments, the control system can be programmed using G-code or another numerical control programming language to control the machine components. In some embodiments, a three-dimensional printer processor with slicer software can be used to determine the flow rate and pattern of dispensing the precursor material. The printer processor can interface with a further processor to translate commands and transmit the to the magnetic assembly and the to pump.

The magnetic assembly 30 can apply a magnetic field to active printing areas that is strong enough to align the magnetically responsive particles in the precursor material. The magnetic field can be produced with control in any direction. The applied field can be well-defined in areas with low material viscosity where the extruded material is still curing. A stronger magnetic field at the active voxel location can enable the alignment of the magnetically responsive particles in materials of higher viscosity, which allows for more flexibility which precursor materials can be printed. The magnetic field does not need to be well-defined in print areas that have already cured. In these locations, the viscosity of the material approaches infinity, and the magnetically responsive particles can be sufficiently fixed in position.

In some embodiments, the magnetic assembly 30 can apply a stationary magnetic field at the print location. A stationary field can be satisfactory for magnetically responsive particles in the form of fibers. In some embodiments, the magnetic assembly can apply rotational magnetic fields at the print location. A rotational field can be useful to align magnetized magnetically responsive particles in the form of platelets. In some embodiments, the magnetic assembly can be flexible to apply stationary and rotational fields, as needed.

Figure 7:
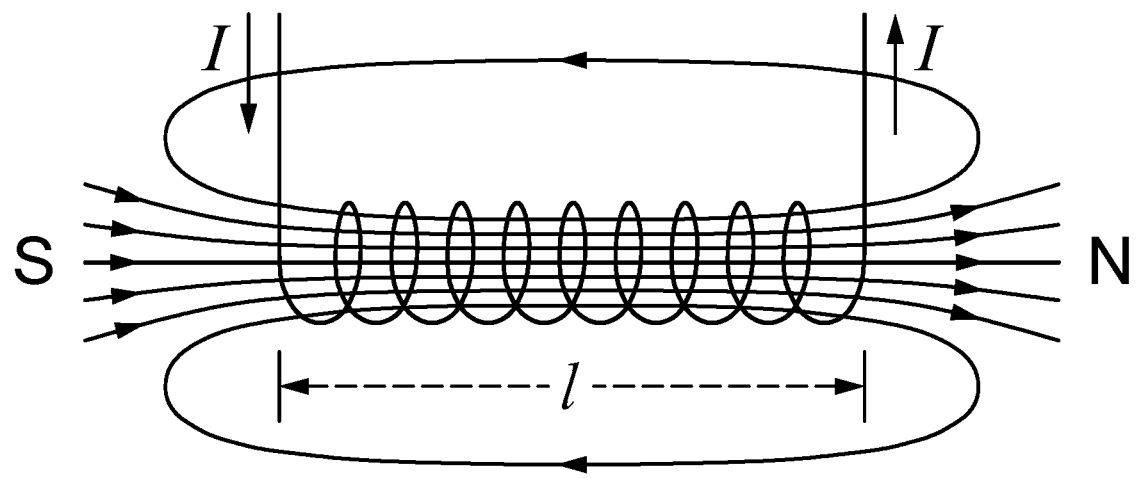
FIG. 7 is a schematic illustration of a solenoid magnetic field.

In some embodiments, the magnetic assembly 30 employs electrically controlled solenoid magnets 36. Solenoids generate a magnetic field by passing current through a cylindrical coil of electrically conductive wiring. See FIG. 7. When compared to rare earth magnets, the magnetic field created by a solenoid is significantly weaker. However, there are many solenoid design parameters that can be adjusted to achieve a stronger field. A smaller wire diameter and multiple winding layers both increase the turn density of a solenoid, which is linearly related to field strength. Additional parameters include solenoid length, diameter, proximity to voxel location, and applied current.

In some embodiments, a solenoid coil wrapped around an air core can be provided. In other embodiments, to more readily achieve the desired field strength without a highly powered and cumbersome solenoid, a soft magnetic metal with a high magnetic permeability can be used as a core material to greatly increase the field strength. Such soft magnetic metals can magnetically align with an externally applied magnetic field, amplifying the applied field's strength while maintaining directionality.

Figure 8:
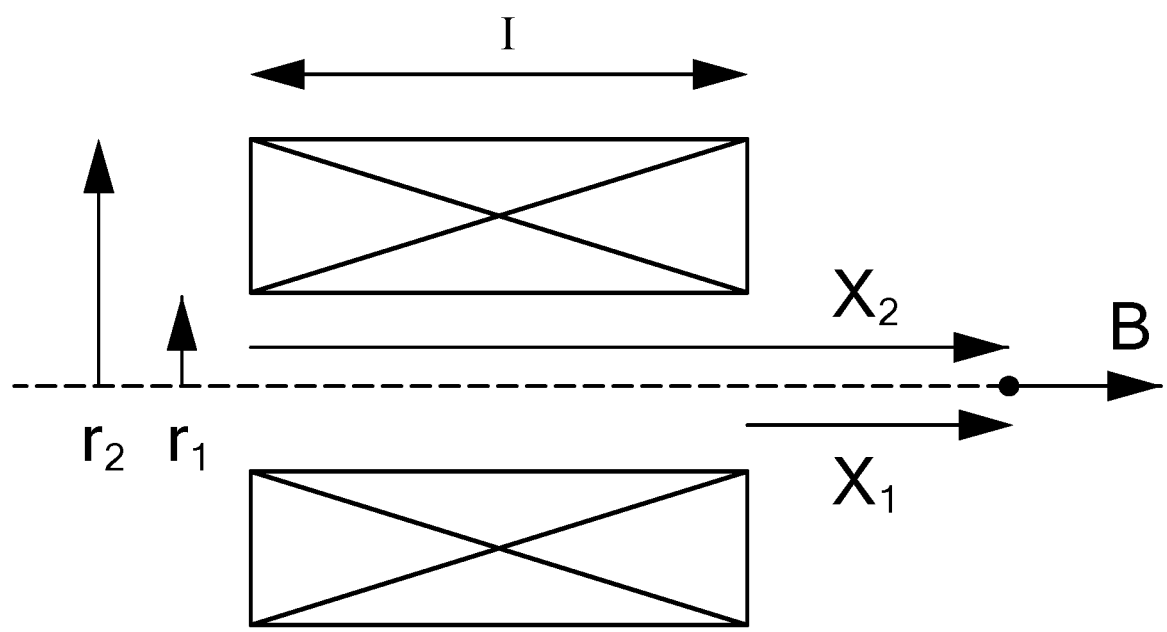
FIG. 8 is a schematic cross-sectional view of a solenoid.
Figure 9:
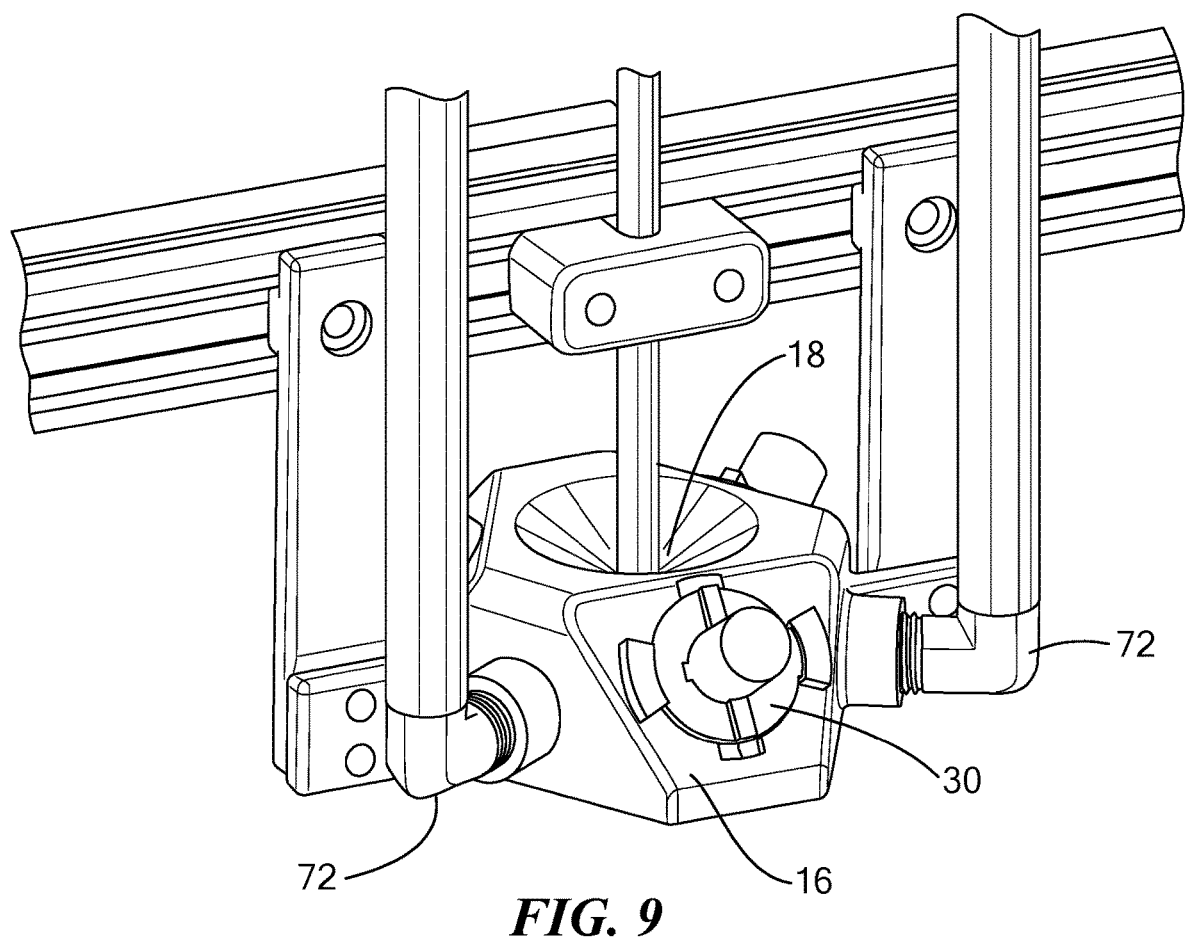
FIG. 9 is an isometric view of an embodiment of a print head.
Figure 10:
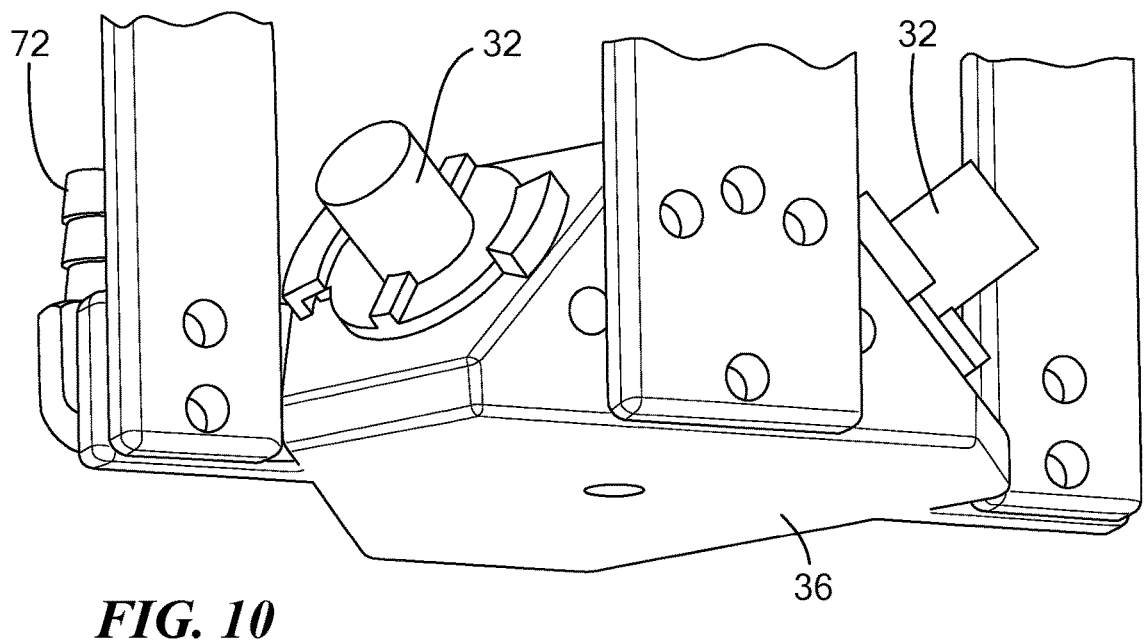
FIG. 10 is a rear isometric view of the print head of FIG. 9.
Figure 11:
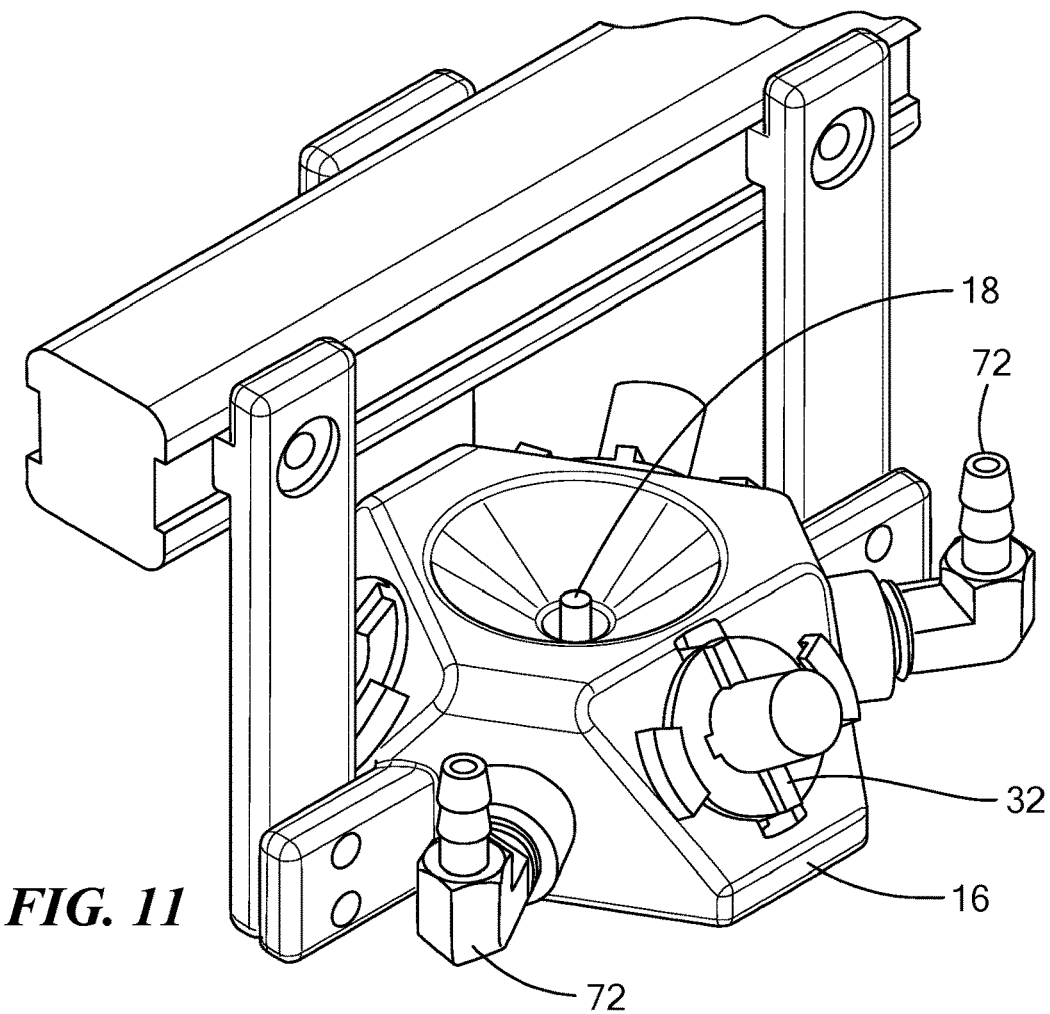
FIG. 11 is a further isometric view of the print head of FIG. 9.
Figure 12:
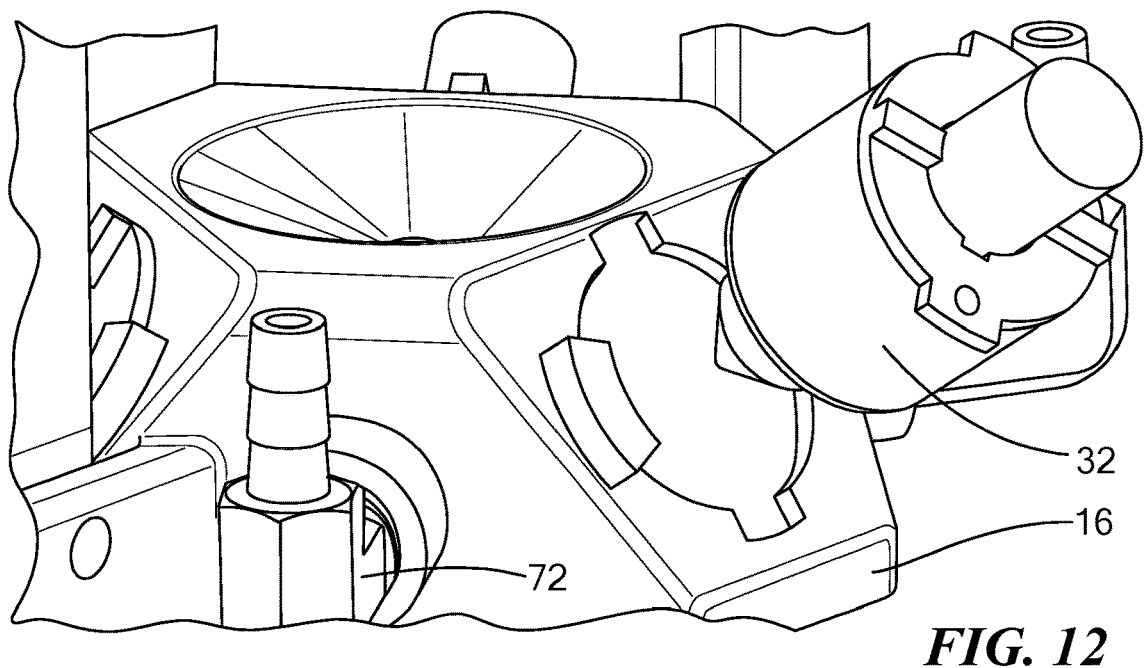
FIG. 12 is an exploded isometric view of the print head of FIG. 9.
Figure 13:
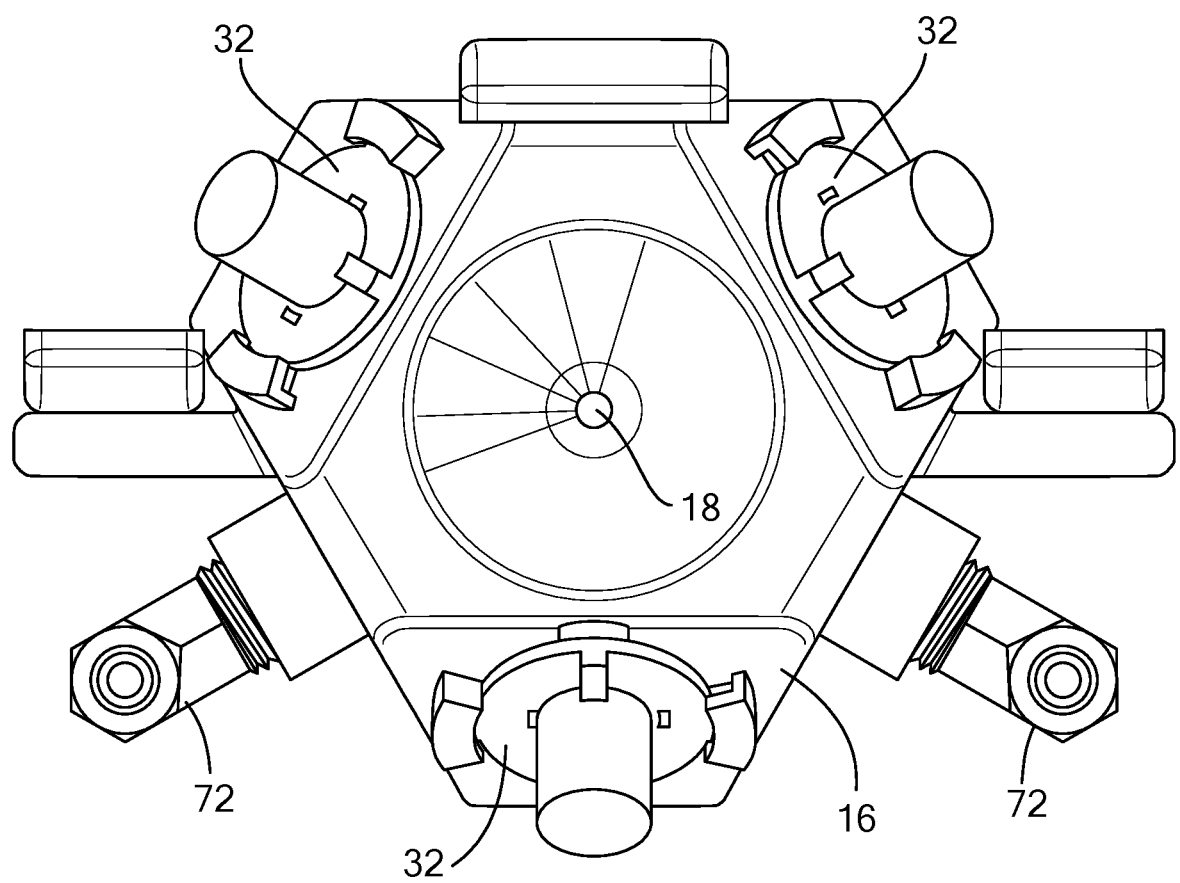
FIG. 13 is a top view of the print head of FIG. 9.

The theoretical field strength along a solenoid's axis can be found using following equation:

$$B_t = \frac{k\mu_0 I n}{2(r_2 - r_1)} \left[ x_2 \ln\frac{\sqrt{r_2^2 + x_2^2} + r_2}{\sqrt{r_1^2 + x_2^2} + r_1} - x_1 \ln\frac{\sqrt{r_2^2 + x_1^2} + r_2}{\sqrt{r_1^2 + x_1^2} + r_1} \right]$$

where $B_t$ is magnetic flux density, $\mu_0$ is the magnetic permeability of free space, k is relative magnetic permeability of the core material, $r_1$ and $r_2$ are the inner and outer radii of the solenoid, respectively, $x_1$ and $x_2$ are the distances from the near and far face of the solenoid, respectively, I is the current, and n is the turn density per unit length. FIG. 8 illustrates the dimensions $r_1$, $r_2$, $x_1$, and $x_2$.

Core materials can be selected to maximize magnetic field strength. Suitable alloys can include iron and low carbon steels, supermalloy, iron-silicon alloys, iron-aluminum-silicon alloys, nickel-iron alloys, iron-cobalt alloys, ferrites and amorphous alloys including ferrous alloy powder cores. Low carbon steels are inexpensive soft magnetic alloys. Supermalloy is an alloy that requires heat treatment processes to maximize magnetic permeability. A ferrous alloy powder material under the name KoolMµ is commercially available.

Solenoids can be integrated into the print head without additional moving parts. The current applied to each solenoid can be controlled independently by a suitable processor. With a processor-controlled DC electronic control circuit for each solenoid, multiple independent solenoids can be controlled to create the desired resultant magnetic field. Three solenoids can be oriented orthogonally with an origin at the print voxel location and mounted on the print head as shown in FIGS. 5 and 9-13. With this configuration, it is possible to create resultant fields in all directions at the active voxel location. Magnetic fields follow basic properties of superposition using vector addition. Thus, the magnitude and direction of current applied to each solenoid can be controlled to achieve any desired field direction.

When aligning fibers in a voxel, fibers in adjacent voxels could be unintentionally realigned due to inconsistent fields outside of the print location. Curvature of the magnetic field is inherent to solenoid design. However, if the magnitude of the field strength outside desired alignment areas is decreased, realignment errors can be reduced. More particularly, a solenoid core is magnetized along the direction of an externally applied field. Therefore, each point of the core is magnetizing along a specific field line with an elliptical curvature. Field curvature increases away from the neutral axis of the solenoid, which is where error may be introduced. The goal of a localized field from a solenoid is to amplify magnetic field lines near the center axis of the solenoid and reduce fields further away from the center that could introduce error.

Figure 14:
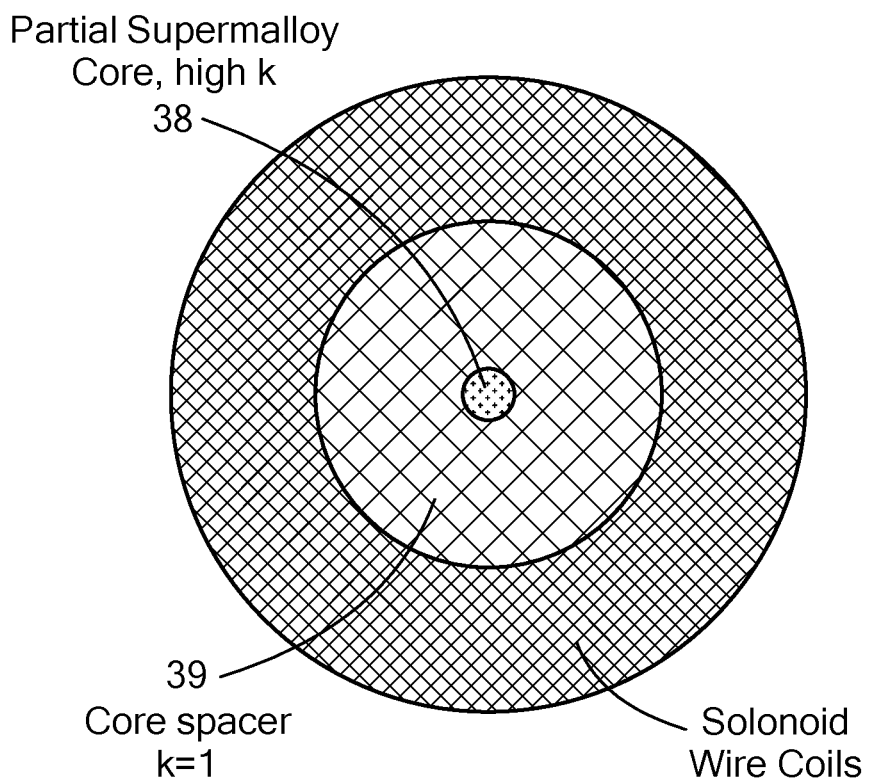
FIG. 14 is a schematic illustration of a partial core solenoid.
Figure 15:
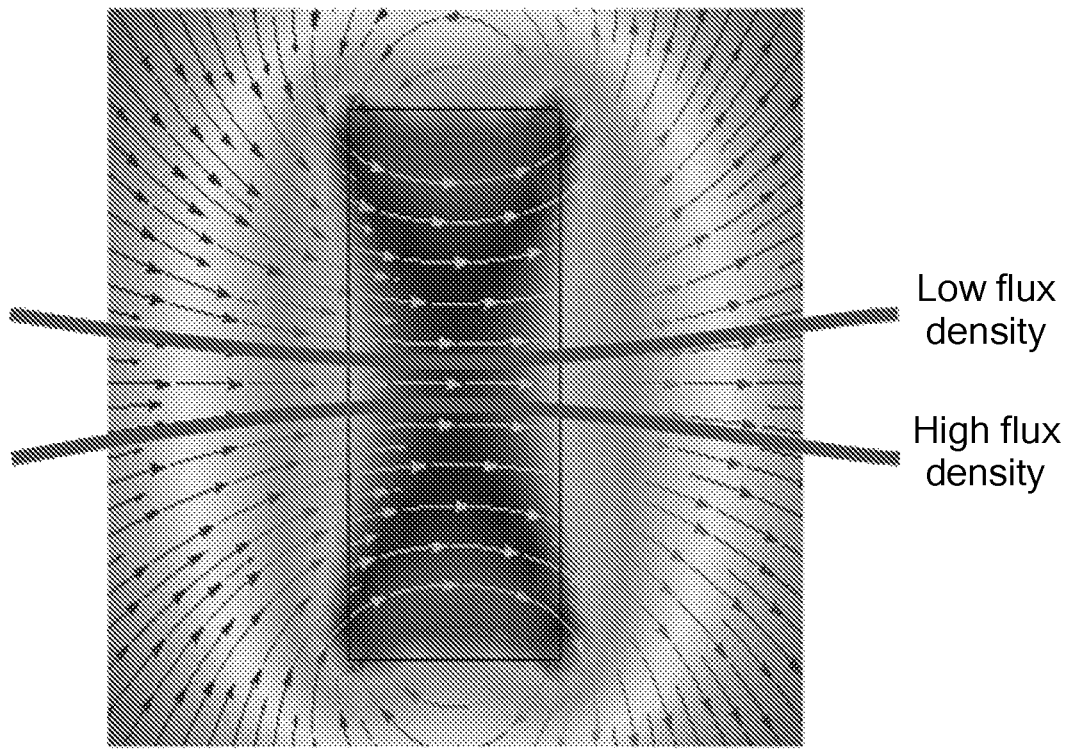
FIG. 15 is a schematic illustration of the magnetic field strength a partial core solenoid.

In some embodiments, each solenoid can include a partial, cylindrical core 38 aligned on the solenoid's neutral axis to achieve a localized field. See FIG. 14. The solenoid includes a partial, cylindrical core aligned on the neutral axis with a high magnetic permeability to amplify the solenoid's central field lines. A surrounding spacer material 39 with a low magnetic permeability comparable to air does not amplify field lines that introduce error. The magnetic field resulting from this solenoid design can have high flux density along its neutral axis, and low flux density in areas with high curvature, as indicated in FIG. 15.

Figure 16:
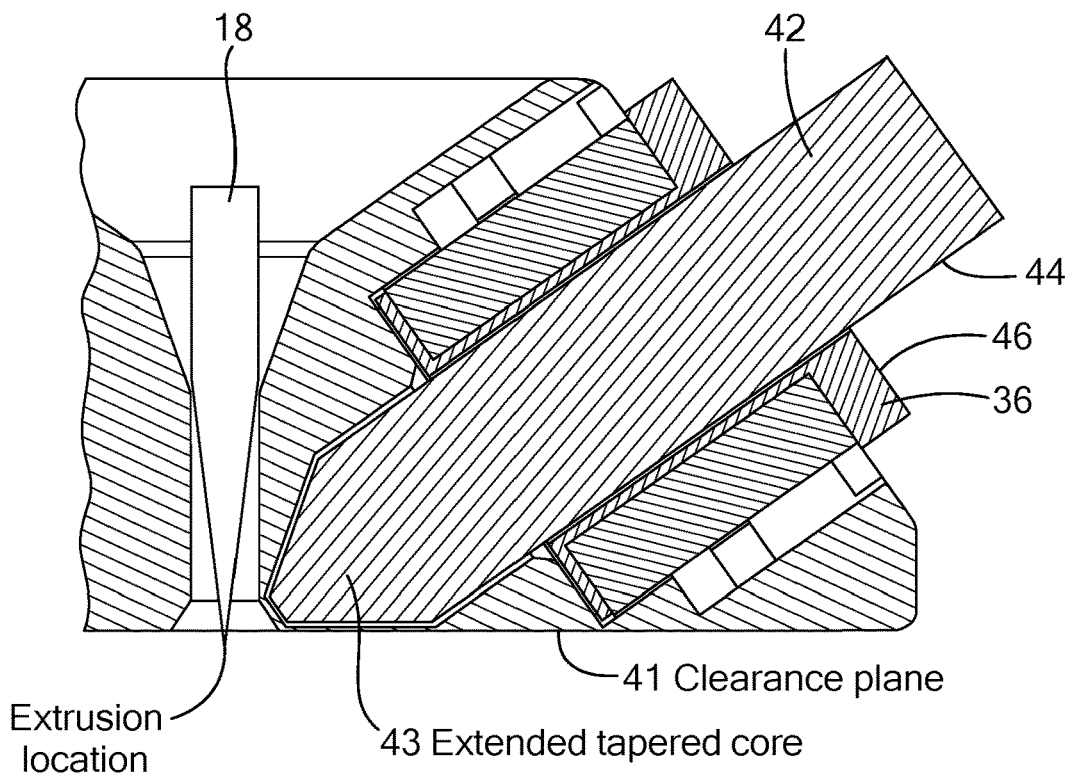
FIG. 16 is a schematic illustration of an extended core solenoid.

In some embodiments, a solenoid with an extended core 42 can be used. See FIG. 16. (See also FIGS. 9-13.) An extended core solenoid provides an increase in relative magnetic permeability, which can increase field strength of the apparatus. In some embodiments, the three axis orthogonal solenoid orientation on the print head can cause the front face 41 of the solenoids to be a few centimeters from the printing location in order to stay above the printing clearance plane. Thus, the material of the core 42 can include a tapered extension 43 towards the clearance plane to increase field amplification, as shown in FIG. 16. In some embodiments, field amplification can be further increased by an extension 44 of the core beyond the top face 46 of the solenoid. In some embodiments, the extension 44 can be provided without the extension 43.

In some embodiments, a cooling system can be implemented to cool the magnetic assembly, and in particular, the solenoids. For example, during operation in some embodiments, the solenoids can carry up to 3.5 A of current through hundreds of wire coils. As a resistive element, the solenoid can generate significant heat during operation. These operation temperatures can in some cases exceed 100° C., which can be damaging to the printed parts and solenoid wire insulation.

Figure 17:
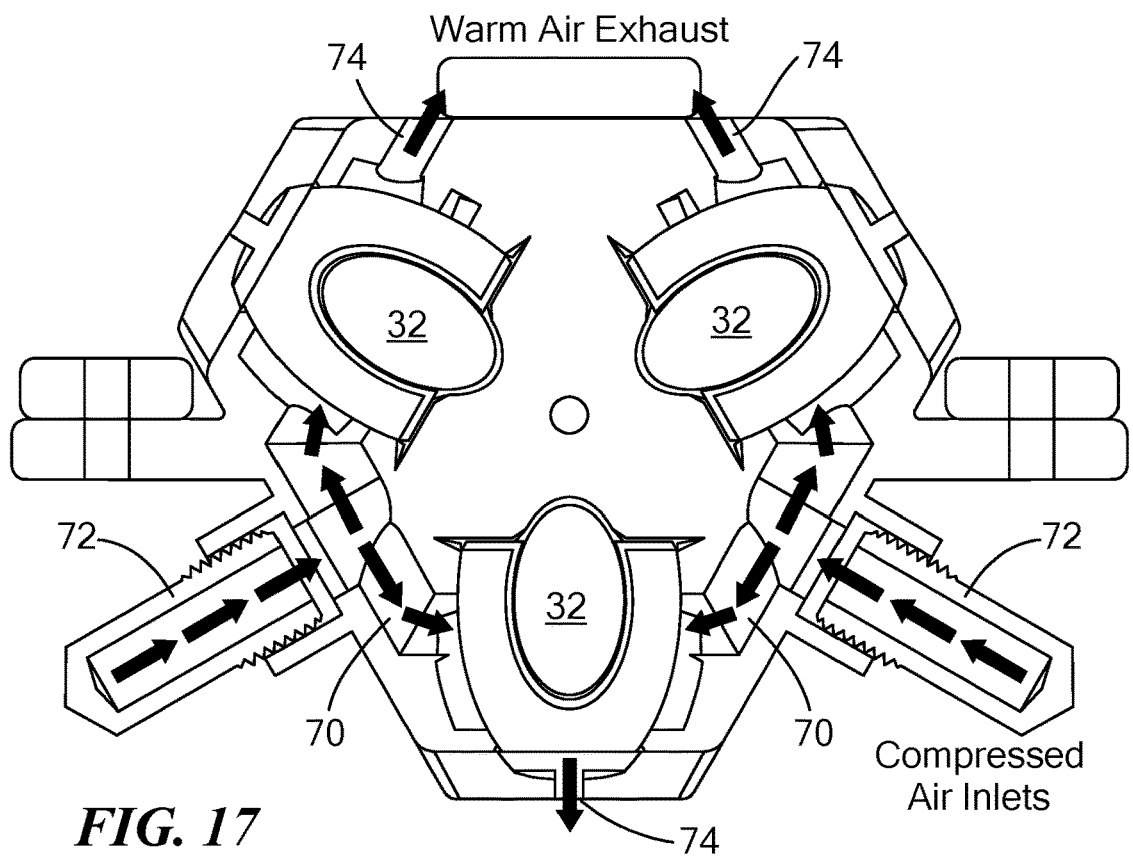
FIG. 17 is a schematic view of a print head with a cooling system.

More particularly, in some embodiments, the solenoid mounting to the print head 12 can incorporate internal channels 70 within the block 16 for a cooling fluid, such as compressed air or water. Referring to FIG. 17, in one embodiment, the solenoids are mounted within the block 16, and the block includes channels 70 that direct the cooling fluid to regions surrounding each solenoid. Inlet fittings 72, such as NPT fittings, can be attached to an inlet of each channel. The inlet fittings can be connected to a source of cooling fluid, such as water or air under pressure. Ventilation channels 74 from each region exhaust warm cooling fluid out of the print head. In some embodiments, the cooling fluid can be integrated with a heat exchange system to recapture some of the heat.

The block can be fabricated in any suitable manner, depending on the configuration, such as with a 3D printing or an additive manufacturing process, or by machining or molding. In other embodiments, one or more heat sinks can be attached to the back of extended solenoid cores to increase surface area for convection of heat out of the solenoid.

Figure 18:
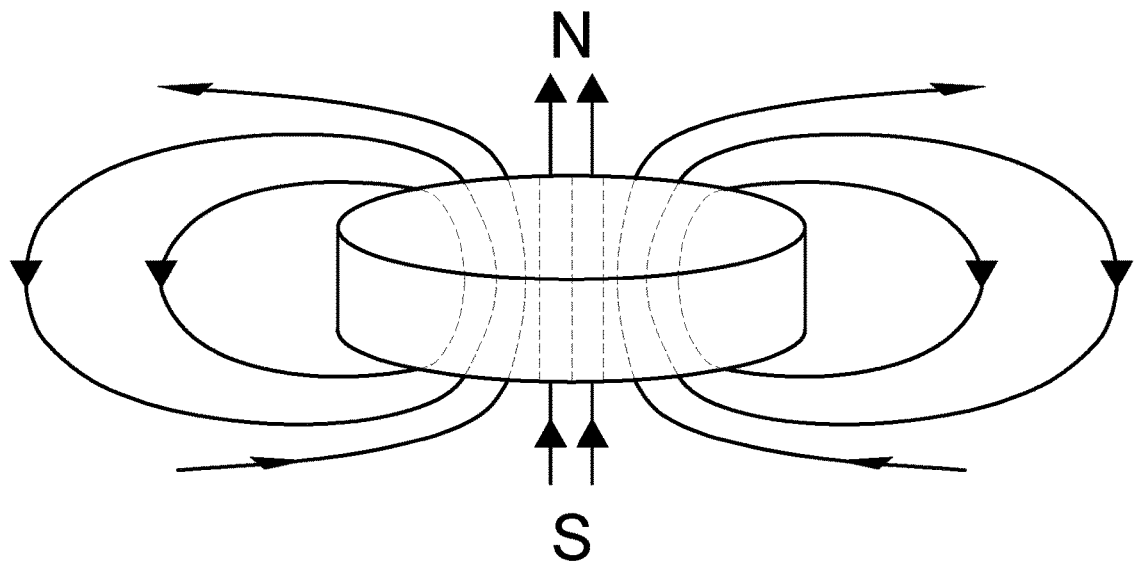
FIG. 18 is a schematic illustration of a magnetic view of a permanent magnet.

In some embodiments, the magnetic assembly can employ permanent magnets or ferromagnets, including ferromagnetic materials such as iron, cobalt, nickel and their alloys, some manganese compounds, and some rare earth materials. Such magnets are made of highly magnetic metals that have a permanent, strong magnetic field. See FIG. 18. A high magnetic field strength can be achieved with a reasonably-sized rare earth magnet. Since the magnetic field is permanent, the flux density and field curvature around the magnet are reliable and well-defined.

In some embodiments, a mechanical control system can be provide to orient the field in a desired direction. The control system can physically translate one or more magnet in the XY plane and rotate the magnet(s) about two axes in order to be able to provide a magnetic field in all directions. This control system can be advantageous when creating a rotational magnetic field, because the field rotation would be continuous with continuous magnet rotation.

As noted above, the control system is provided for the magnetic assembly. For solenoids, an electrical control system can be provided to accurately adjust the magnitude and polarity of applied current to each solenoid. With an orthogonal three-axis solenoid orientation, aligning in a desired direction requires coordination of the three solenoids to produce a resultant magnetic field. In some embodiments, direct current (DC) power is used to control each solenoid. DC power provides the ability to maintain a constant magnetic field direction, which is advantageous for aligning fibers or rods, which do not necessarily require rotational fields.

Figure 19:
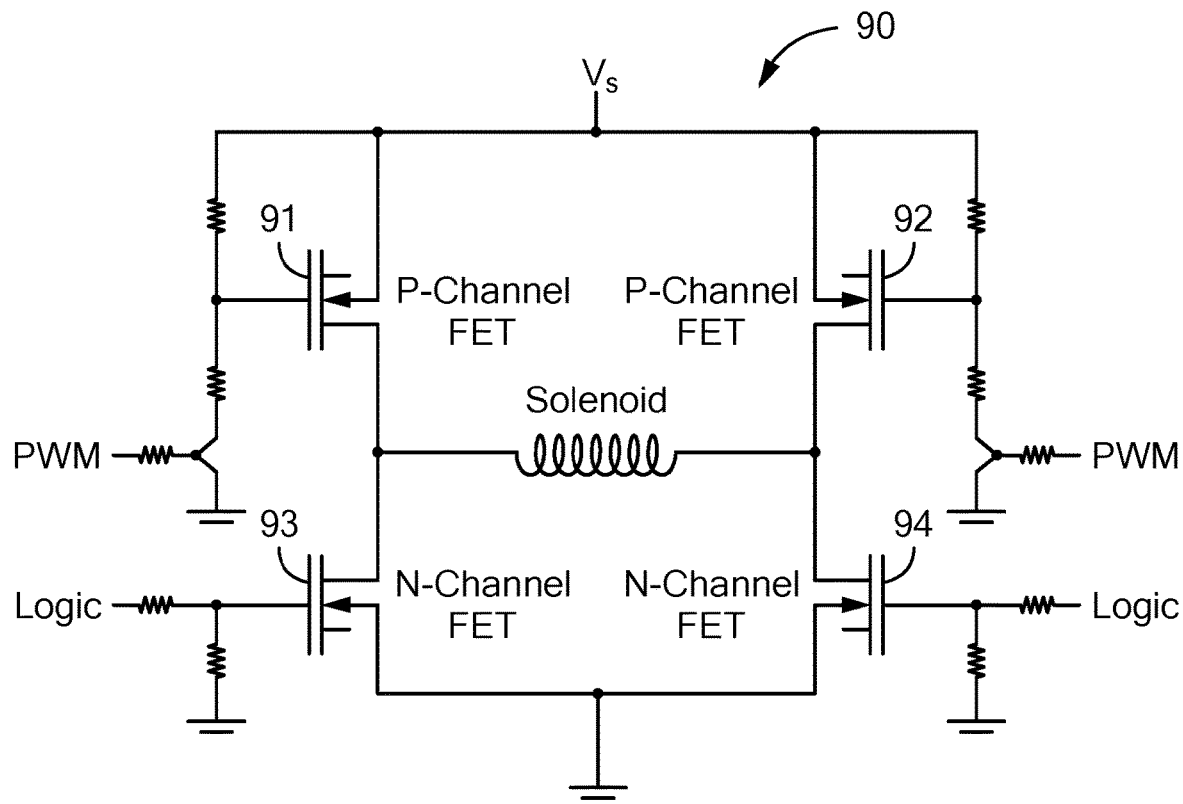
FIG. 19 is a circuit diagram of an embodiment for solenoid control.
Figure 20:
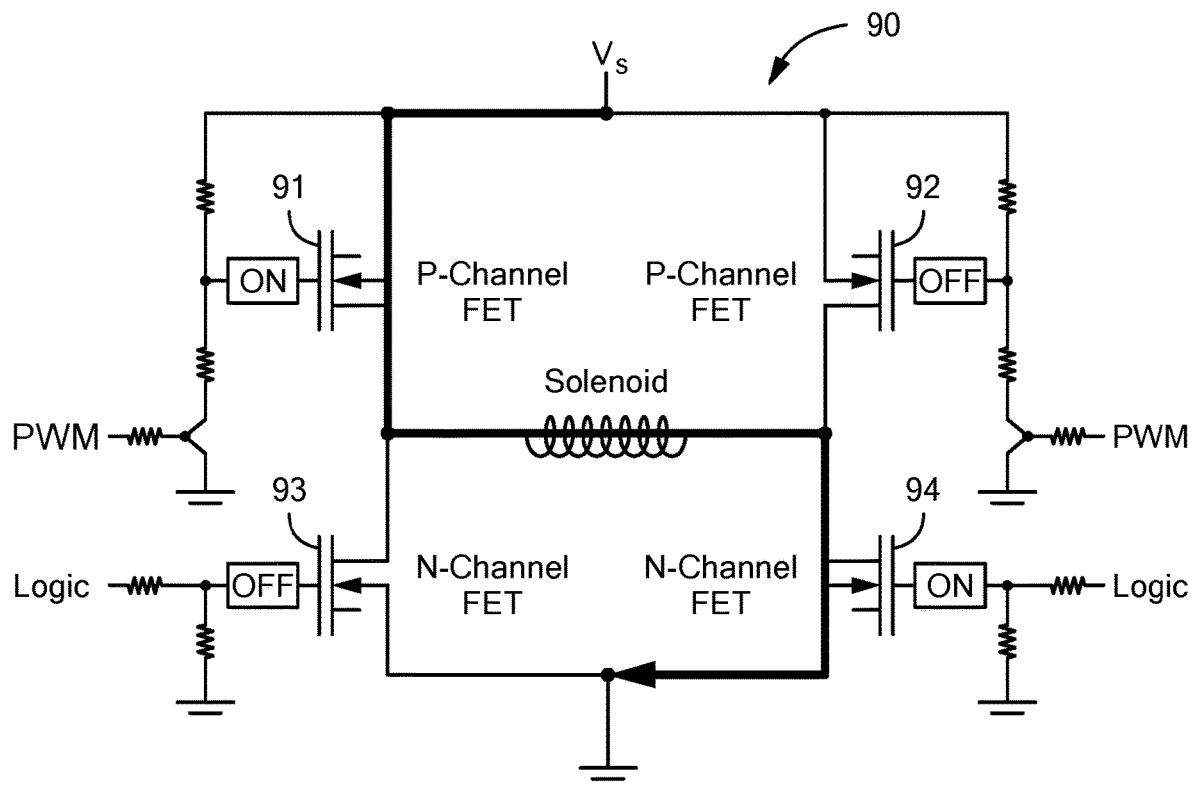
FIG. 20 is a circuit diagram of FIG. 19 illustration current flow in one direction.
Figure 21:
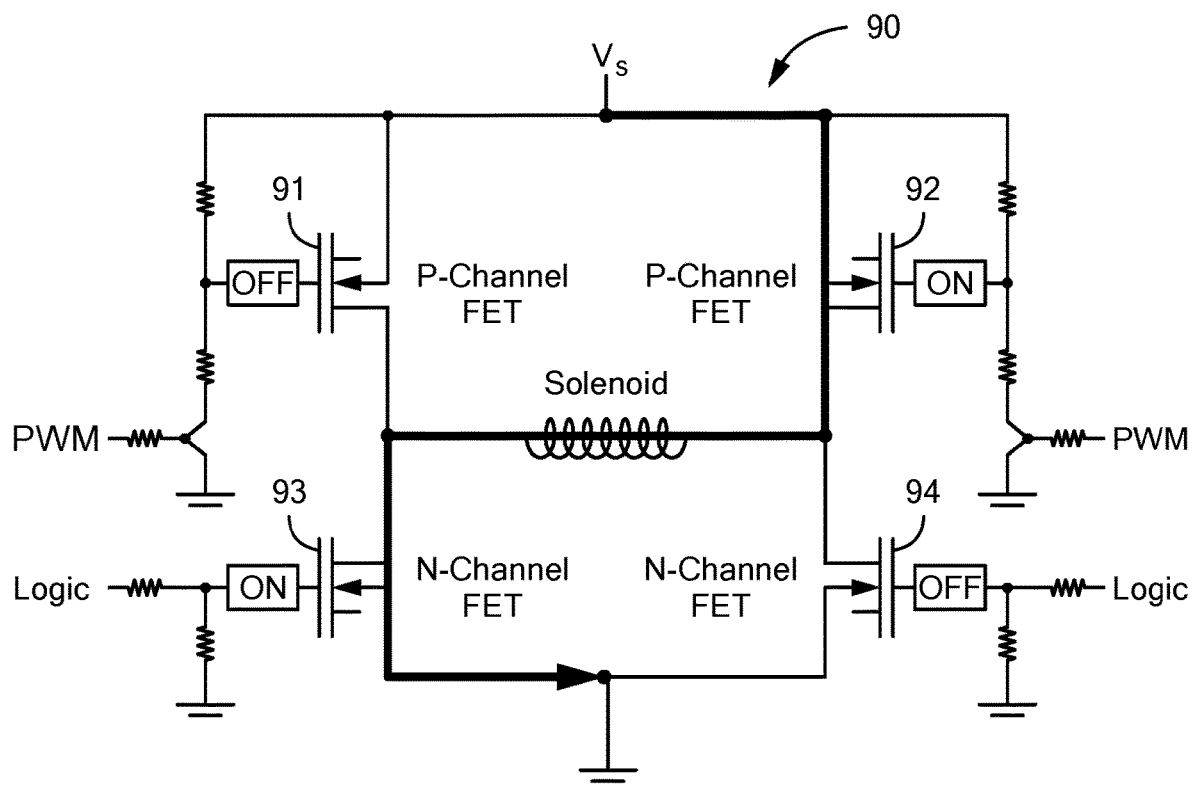
FIG. 21 is a circuit diagram of FIG. 19 illustration current flow in another direction.

In some embodiments, to effectively control the magnitude and direction of the current through each solenoid coil, each solenoid can be positioned as the load across an H-bridge circuit controlled using pulse width modulation (PWM). An H-bridge circuit 90 can include four transistors 91, 92, 93, 94 that can be turned on in certain combinations to control the current direction through the load, as shown in FIG. 19. For example, if transistors 91 and 94 are turned on and transistors 92 and 93 are turned off, current flows through the open transistors in the direction, illustrated in FIG. 20. In the opposite case, transistors 92 and 93 are turned on while transistors 91 and 94 are turned off, and current flows through the load in the opposite direction, as illustrated in FIG. 21. In some embodiments, the transistors can be field effect transistors.

In some embodiments, the state of the transistors can be controlled by, for example, logic pins from a processor. In order to control the magnitude of the current, the voltage signal to the transistor required to allow current to pass through the transistor can be subject to pulse width modulation (PWM). The purpose of applying PWM to the transistor is to control the current that is passed through the transistor from the main power source. This is the current that is passed through the solenoid load. The DC power source produces a constant voltage potential, and the resistive properties of the circuit determine how much current is pulled from the power source. Since this voltage is constant, the purpose of PWM is to pulse the full value of the voltage for a percentage of time at a high frequency to produce a lower, controlled voltage drop across the circuit, and thus a controlled current.

The solenoid is an inductive coil and resists sudden changes in current. As a result, it smooths the incoming square current wave caused by the PWM into a sinusoidal current curve. The smaller the amplitude of this sinusoidal curve, the more accurately the solenoid maintains the average applied current and resultant magnetic field.

In some embodiments, the control system can include one or more processors programmed to control the superposition of magnetic fields from each solenoid at the active voxel location. The processor(s) can provide a PWM value that corresponds to a designated alignment direction, which can, for example, be stored in a library. Once a new alignment direction is received, the program can calculate the power required to each solenoid to achieve the desired field direction, for example, using matrix multiplication.

To calculate solenoid power, the direction of each solenoid's neutral axis is represented by a unit vector in relation to the print head's coordinate system with an origin at the print location. Each of these vectors is represented in the matrix [S], with columns 1, 2 and 3 corresponding to solenoids A, B and C, respectively. Rows 1, 2 and 3 correspond to the X, Y and Z components of the solenoid's unit vector, respectively. Alignment directions are represented by vectors in the form of arrays throughout the code. The X, Y and Z components of an alignment direction are represented by columns 1, 2 and 3 of the matrix [D]. In order to control the magnitude of calculations based off [D], it is normalized to a unit vector, [$D_N$]. The power to each solenoid is first calculated as a percentage of the solenoid's maximum power, [p].

$$[S] = \begin{bmatrix} 0 & \frac{1}{\sqrt{2}} & -\frac{1}{\sqrt{2}} \\ \frac{2}{\sqrt{6}} & -\frac{1}{\sqrt{6}} & -\frac{1}{\sqrt{6}} \\ \frac{1}{\sqrt{3}} & \frac{1}{\sqrt{3}} & \frac{1}{\sqrt{3}} \end{bmatrix}, [D] = \begin{bmatrix} x_D \\ y_D \\ z_D \end{bmatrix},$$

$$[D_N] = \begin{bmatrix} \frac{x_D}{\sqrt{x_D^2 + y_D^2 + z_D^2}} \\ \frac{y_D}{\sqrt{x_D^2 + y_D^2 + z_D^2}} \\ \frac{z_D}{\sqrt{x_D^2 + y_D^2 + z_D^2}} \end{bmatrix}, [p] = \begin{bmatrix} p_A \\ p_B \\ p_C \end{bmatrix}$$

Multiplying [S] by [p] must equal [D]. In order to calculate the values of [p] that satisfy this condition for a given [D], the inverse of [S] is multiplied by [D]. Once [p] is calculated, it must be converted from percentages of maximum power to the corresponding PWM values, [P], by multiplying [p] by the maximum PWM value.

$$[S][p]=[D], \text{ therefore } [S]^{-1}[D]=[p]$$

$$[P]=(\text{maximum PWM value})*[p]$$

Figure 22:
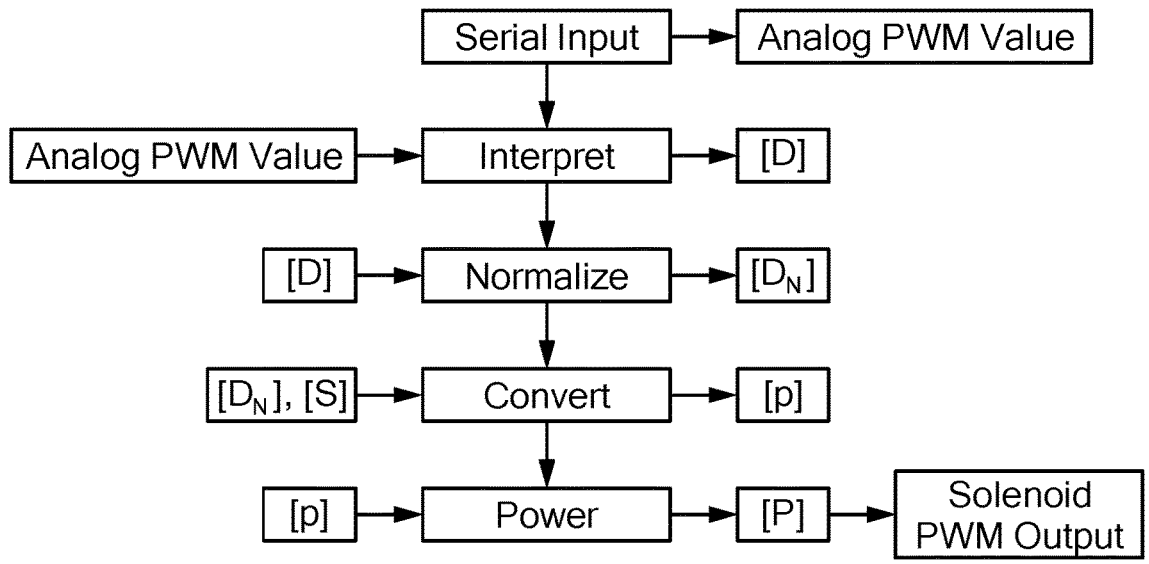
FIG. 22 is a flow chart of an embodiment of solenoid control.

If a solenoid's PWM value is positive, the positive side of the H-Bridge is activated, and vice versa. The signal required to allow current through the high-side transistor is pulsed by the processor at the calculated PWM value. One embodiment of a schematic of solenoid powering for fiber alignment is illustrated in the flowchart of FIG. 22.

The long axes of fibers can be reliably aligned with constant magnetic field directions, which can be achieved using DC power as noted above. However, platelets tend to require rotational magnetic field directions in order to align platelets in a specified plane. Rotational fields are effective because they expose the platelet to fields along each of its long axes. It has been shown that continuously rotating fields created by two perpendicular solenoids cycling with out-of-phase AC currents can produce good platelet alignment. Thus, in some embodiments, AC power supplies can be used. However, alignment of a magnetic field with an orthogonal three-axis solenoid orientation is more complicated, and controlling three different AC power supplies to the solenoids is costly.

To mimic the effects of a rotational AC field, in some embodiments, a field produced using DC current can be pulsed between two perpendicular field directions in the plane of alignment. For example, if alignment in the XY plane is desired, alternation between field directions along the X and Y axes can create the desired magnetic torques to align platelets in the XY plane.

More particularly, the plane of platelet alignment is designated by a vector normal to the plane of alignment, [$P_N$]. Since the cross product of any two vectors is normal to their common plane, the inverse of the first pulsing direction, [$P_1$], is calculated as the cross product of [$P_N$]$^{-1}$ and the inverse of a randomly generated vector, [R]. The inverse of the second pulsing vector, [$P_2$], is calculated as the cross product of [$P_N$]$^{-1}$ and [$P_1$]$^{-1}$.

$$[P_N] = \begin{bmatrix} x_N \\ y_N \\ z_N \end{bmatrix}, [R] = \begin{bmatrix} \text{random number} \\ \text{random number} \\ \text{random number} \end{bmatrix}$$

$$[P_1]^{-1} = [P_N]^{-1} \ X \ [R]^{-1}$$

$$[P_2]^{-1} = [P_N]^{-1} \ X \ [P_2]^{-1}$$

Once the two pulsing vectors are calculated, they can be processed for solenoid power in the same method as [D]. Each time the pulse direction changes, the processor calculates the PWM value required to achieve that resultant pulse direction and powers the solenoid.

The control system involves control of the relative motion of the print head and the bed and the pump, as well as the magnetic assembly. In some embodiments, a main control processor for the print head can be provided that communicates with processors for controlling the magnetic assembly and the pump.

In some embodiments, the apparatus can be a direct write three dimensional (3D) printer or fused filament fabrication (FFF) printer that has a main processor or control board programmable by any suitable 3D slicing software (for example, Slicer) to generate G-code or another numerical control code from three dimensional CAD files (such as STL files or any other suitable file format). Outputs from the main control board can be connected to one or more processors associated with the magnetic assembly and the pump. A G-code command line calling for a particular task can communicate with the main control board to send a specific analog or digital signal to the appropriate processor, which in turn sends a serial command to the magnetic assembly or to the pump.

The output commands to the two other processors can be embedded into the G-code or other control code. This can be done either through adjusting the settings of the slicer program that creates the G-code (pre-processing), manipulating the G-code after it has been created, e.g., using a python script (post-processing), or a mixture of pre-processing and post-processing.

For example, the main processor can send a PWM value to the solenoid processor that corresponds to a library value. The PWM value corresponds to an alignment direction programmed into the library. All other information regarding pulse duration and amperage to the solenoids can be programmed directly into the solenoid processor. For the pump, commands to start and stop flow and control flow rate can be communicated from the main processor to the processor connected to the pump.

Figure 23:
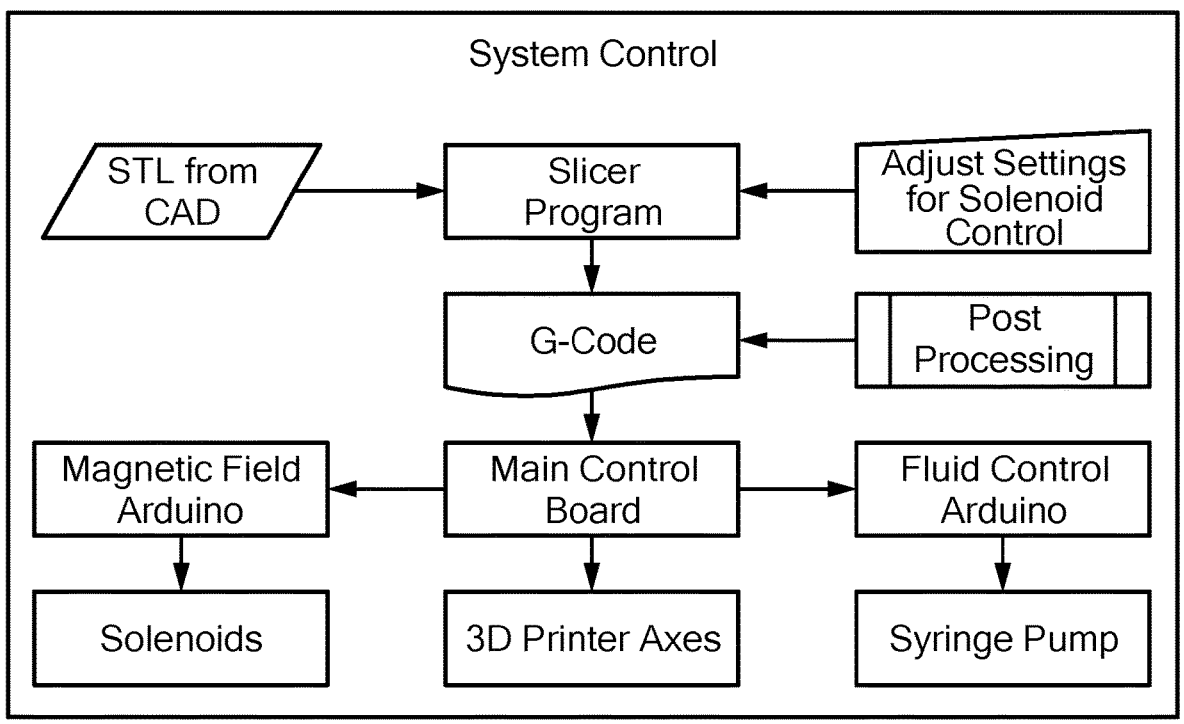
FIG. 23 is a flow chart of an embodiment of system control.

The main control board can use any available output pins to communicate the commands to the processors. Depending on availability of output pins and style of output (digital, analog, PWM), as little as one output pin per processor can be used to complete all synchronization. This process is displayed in FIG. 23.

The alignment of fibers in a printed voxel is dynamic and time-sensitive. The alignment time for a printed voxel is dependent on the initial voxel viscosity, the rate of change of the voxel viscosity, the relative speed between the print head and the bed, and the strength of the applied magnetic field.

The behavior of a voxel in the orthogonal solenoid system can be described with reference to FIG. 24. When a voxel is first extruded, it has an initial viscosity that is increasing as a function of time. The relative velocity of the print head, including the magnetic assembly, to the bed increases the distance of the printed voxel from the focal point of the solenoids as a function of time.

As a voxel moves away from the focal point of the solenoids, the direction of the applied magnetic field has an increasing angular error. For this reason, a tolerance radius is defined as the radius inside of which the magnetic field direction is within an acceptable angular tolerance. In some embodiments, the acceptable angular tolerance is 15°.

In order to achieve successful alignment, a voxel must be exposed to the magnetic field for long enough for fibers to rotate and align. Additionally, a voxel's viscosity must increase to a point at which it is no longer affected by magnetic fields before leaving the tolerance radius. This ensures that there is no possibility of fiber realignment error. The relative speed is thus determined by the time required for alignment and curing or solvent evaporation.

In some embodiments, the strength of the applied magnetic field can be controlled to optimize the alignment and curing process. The stronger the applied flux density, the faster the alignment time is.

As the alignment time decreases, several system variables become more flexible. In some embodiments, the rate of change of the viscosity can be increased using airflow or heat or both to force faster evaporation of the solvent in the system. This causes voxels to cure more quickly, which allows the relative speed to increase.

In some embodiments, an increase in applied flux density can be used to increase the initial viscosity of a printed voxel. In some embodiments, the alignment time and curing time can remain the same with a higher viscosity fluid.

An increase in the applied magnetic field strength can enable either faster or higher quality printing. Magnetic field strength can be maximized while staying within system parameters.

In some embodiments, solenoids with a partial core with a high magnetic permeability can be used to amplify a localized magnetic field. Referring to FIG. 25, the variation of the magnetic fields within the alignment zone is amplified by the partial core with high magnetic permeability. Outside of the alignment zone, the field is not amplified by the spacer material surrounding the core.

Since the field strength outside the tolerance radius is significantly less than the amplified field, it does not exhibit misalignment effects. In some embodiments, the alignment time is the significant driver of printer speed. As long as the printer moves slowly enough to enable alignment within the tolerance radius, proper alignment can be achieved.

If the magnetic permeability of the partial core is high enough, the field strength reduction outside of the tolerance radius can be significant enough to have no misalignment effects. Thus, a partial core solenoid system can significantly improve printing speed while increasing confidence in fiber alignment tolerances.

Figure 26:
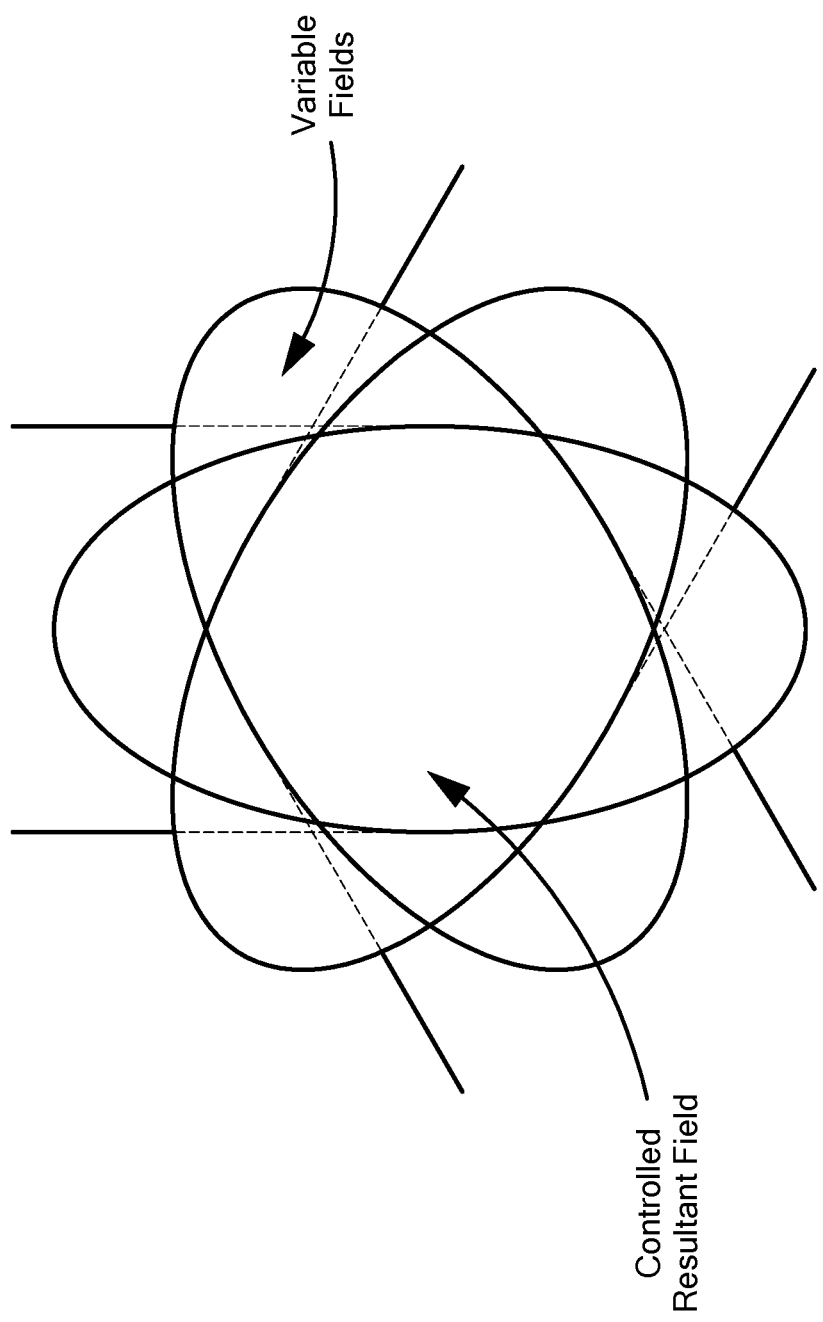
FIG. 26 is a schematic field projection of partial core solenoids.

The actual projections of amplified field lines on the printing planes are not be perfectly concentric circles. Instead they are concentric ellipses, as shown in FIG. 26, which may introduce small areas with field direction errors immediately bordering the tolerance radius. However, in many cases, these areas are small enough to not affect alignment.

The alignment radius of a partial core design is defined by the geometry of the solenoids, since they directly determine the radius at which the magnetic field becomes amplified. In some embodiments, a finite element analysis can be used to determine the tolerance of the alignment zone for partial core solenoids.

The magnetically responsive precursor material includes a matrix material and a plurality of magnetically responsive particles. The precursor material can be any suitable liquid material that can be pumped as a liquid to the bed and that cures to a solid. In some embodiments, the precursor material includes a solvent that evaporates once the material has been dispensed onto the bed to cure the material. In some embodiments, the viscosity of the precursor material can range from 0.001 Pa·s to 10,000 Pa·s. In some embodiments, the viscosity of the precursor material can range from 0.01 Pa·s to 100 Pa·s. In some embodiments, the viscosity of the precursor material can range from 0.01 Pa·s to 10 Pa·s.

In some embodiments, the magnetic material can be a ferromagnetic material, a paramagnetic material, a superparamagnetic material, iron oxide, iron, cobalt, nickel, an iron alloy, a cobalt alloy, or a nickel alloy. In some embodiments, the magnetic material can comprise particles, microbeads, nanoparticles, filing, fibers, flakes, rods, whisker, or platelets. In some embodiments, the magnetically responsive particles can be anisotropic in shape in at least one dimension. In some embodiments, the magnetically responsive particles can have a longest dimension ranged from 200 nm to 1000 μm. In some embodiments, the magnetically responsive particles can have an aspect ratio ranging from 2 to 200. In some embodiments, the magnetically responsive particles can comprise a non-magnetic material coupled with the magnetic material. In some embodiments, the non-magnetic material can be aluminum oxide, calcium phosphate, copper, glass, calcium sulfate, nylon, polystyrene, or silicon carbide. In some embodiments, the non-magnetic material can comprise discontinuous fibers, rods, platelets, flakes, or whiskers. In some embodiments, the non-magnetic material is coated with the magnetic material.

In some embodiments, the matrix material can be a thermoplastic polymer, polyurethane, silicone, acrylic, ABS, nylon, PLA, polycarbonate, polyethylene, polypropylene, polystyrene, polyvinyl chloride, polytetrafluoroethylene. In some embodiments, materials such as collagen, gelatin, and alginate can be used. In some embodiments, the precursor material can includes a solvent. In some embodiments, the precursor material is curable in air. In some embodiments, the precursor material is curable at room temperature. Alternatively, in some embodiments, the apparatus can include a device, such as a heater or UV source, to cure or assist in curing the precursor material.

A variety of products can be fabricated using the apparatus and method. In a further embodiment, catheters, including neonatal catheters, can be fabricated. In some embodiments, catheters 102 can be printed in a horizontal orientation. See FIGS. 27 and 28. The low aspect ratio of a horizontal orientation can improve print accuracy. Initially, a support structure is laid down. The support structure can include a number of horizontally aligned rafts 104 each extending for a length of the desired catheter. In some embodiments, the rafts each have a height of about 1 mm and a width of about 0.25 mm. The rafts can be deposited on a first layer on the bed or build plate if desired. A catheter is then deposited in layers on each of the rafts. The raft supports each catheter sufficiently to ensure that the catheter's cross-section is printed accurately. After printing and curing, the catheters can undergo any additional post processing, such as post curing and cleaning. The rafts are removed from the catheters by any suitable cutting mechanism.

The control system 80 can be part of a computer system that executes programming for controlling the system for the apparatus as described herein. The computing system can be implemented as or can include a computing device that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, mini-computers, main frame computers, and the like.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic device, masked-programmed gate arrays, field programmable gate arrays (FPGAs), and application specific integrated circuits (ASICs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, joysticks, microphones, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link, including without limitation a wired or wireless link. For example, the network connection can allow the computing device to communicate with remote devices over a network, which can be a wired and/or a wireless network, and which can include any combination of intranet, local area networks (LANs), enterprise-wide networks, medium area networks, wide area networks (WANs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission of and receipt of data via the communications link.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

Example 1

A prototype apparatus was fabricated using a K8200 open source FFF 3D printer modified to achieve direct write printing. In this printer, the bed moves in the X and Y directions and the print head moves in the Z direction. The print head was modified to incorporate three orthogonally arranged solenoids. The solenoids were coupled to an Arduino board for processing functions. A Tecan Cavro XLP 6000 syringe pump was used for the pump, coupled to an Arduino board for processing functions. Exemplary embodiments of control code are included in the Appendix.

A solenoid control system was provided as described above using an H-bridge circuit and PWM signals. The solenoid control was tested by measuring the output signals from pins on the Arduino with a multimeter, which indicated successful operation of the H-bridge circuit and PWM signals.

Figure 29:
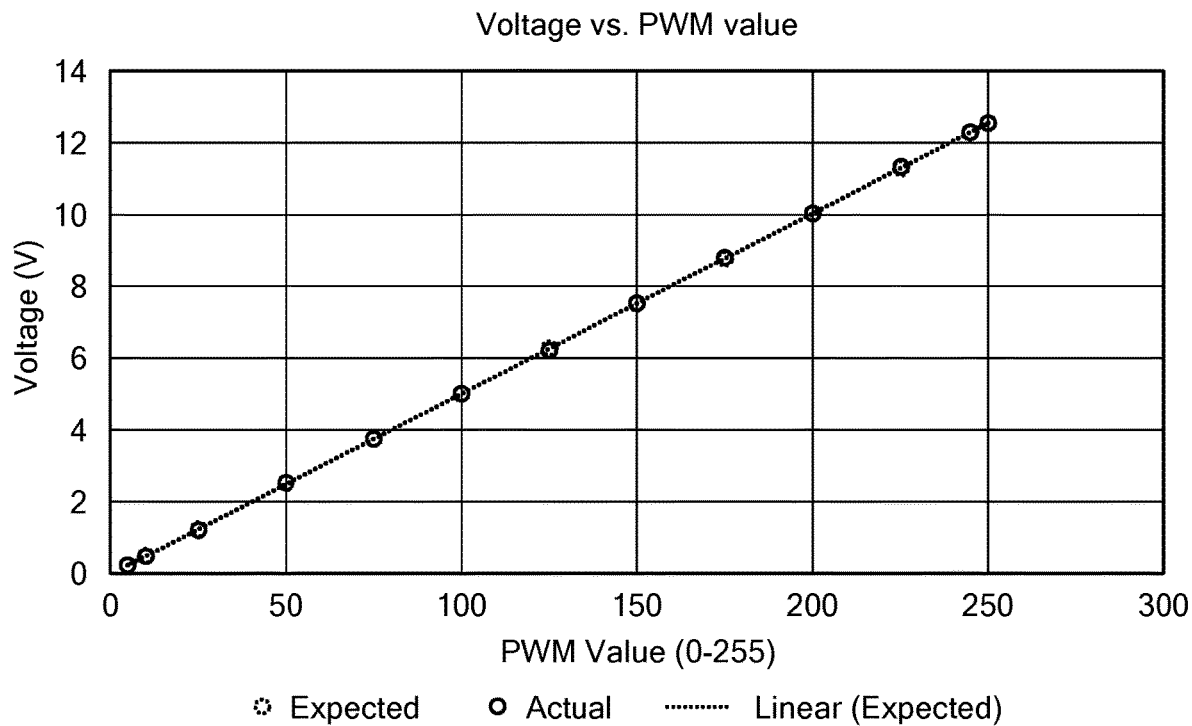
FIG. 29 is a graph of voltage vs. pulse width modulation value

FIG. 29 shows the results of testing of the accuracy of the experimental resultant voltage drop across the load from a specific PWM signal compared to the expected voltage drop. These results illustrate the accuracy and precision of controlling the voltage drop across, and therefore the current through, the circuit. In most cases, the error is less than 1%.

Extended core solenoids were provided, as described above. The relative magnetic permeabilities of extended cores were measured to be 12.05 for 12L14 low carbon steel and 8.78 for KoolMµ, as shown in Table 1. Extending the low carbon steel core by 160% of its length resulted in a 380% increase in magnetic permeability at the extrusion location. Thus, with this apparatus, it is feasible to produce a field strength of 225 Gauss at the printing location.

TABLE 1

| | Magnetic Permeability | |
|---|---|---|
| Material | Full Core, Relative Magnetic Permeability, k | Extended core (260% length), k |
| 1018 Low Carbon Steel | 2.66 | — |
| 12L14 Low Carbon Steel | 2.51 | 12.05 |
| Supermalloy | 2.51 | — |
| KoolMµ | — | 8.78 |
| Heat Treated Supermalloy | 2.59 | — |
| Heat Treated 1018 | 2.63 | — |

Example 2

Initial solenoid testing was conducted using a hand-wound solenoid. To create the solenoid, 18 AWG copper wire with an insulating coating was wound around a 0.5" supermalloy core. 3D-printed flanges were mounted on both ends to create a well-defined solenoid length.

The magnetic field along the center axis of the solenoid was measured using a Gaussmeter, which uses a Hall Effect sensor to measure magnetic flux density. Measurements were taken at distances of 10, 13, and 16 mm away from the front face of the solenoid wiring coils. At each of these offset distances, the magnetic flux density was measured for amperages increasing in 0.5 A increments from 0-5 A.

Figure 30:
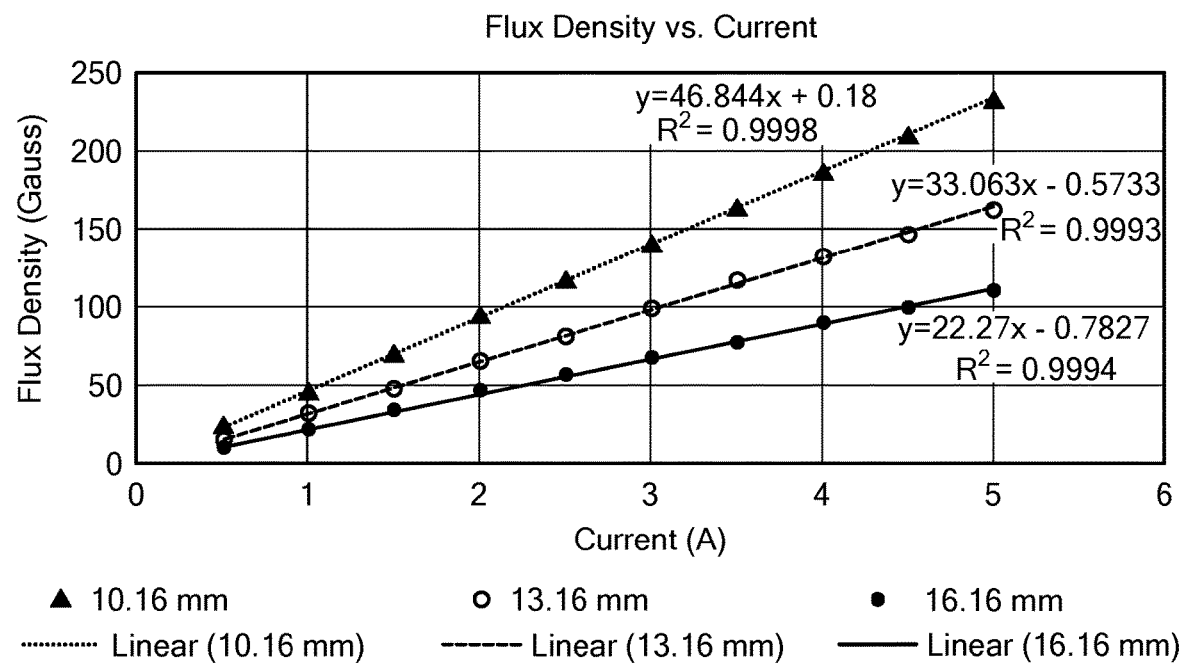
FIG. 30 is a graph of flux density vs. current at various distances form the front face of a solenoid wiring coils.

These flux density measurements are shown in FIG. 30. The strong linear relationship between field strength and current indicates that the magnetic field along the axis of the solenoid is well-defined and the resultant field of three orthogonal can be predictable and reliable.

Magnetic permeability was measured for cores that did not extend beyond the front and back faces of the solenoid that were used in the hand-wound solenoid described above. Extended core solenoids were tested, and the relative magnetic permeabilities of extended cores were measured for 12L14 low carbon steel and for KoolMu. Results are shown in Table 1 above. Extending the low carbon steel core by 160% of its length resulted in a 380% increase in magnetic permeability at the extrusion location. With this design, it is feasible to produce a field strength of 225 Gauss at the printing location.

Example 3

A compressed air solenoid cooling system was provided and instrumented with thermocouples, which recorded solenoid temperature during operation. With no cooling, solenoid operating temperatures during standard alignment cycles quickly exceeded 100° C. The compressed air cooling system maintained solenoid operating temperatures at between 40-60° C. during standard operating cycles.

Example 4

As noted above, three system parameters govern fiber alignment time. Higher magnetic field strength increases the magnetic torque on misaligned fibers, decreasing alignment time. Higher viscosity solutions increase viscous damping effects on fiber rotation, which decreases alignment time. The rate of change of fluid viscosity increases viscous damping of fiber rotation as a function of time.

In order to predict alignment behavior, MATLAB was used to model fiber or rod rotation over time. The magnetic field strength within the tolerance radius was assumed to be constant 225 Gauss in this model. Additionally, viscosity was modeled as a constant since the rate of change of viscosity of a fluid solution is difficult to predict.

Figure 31:
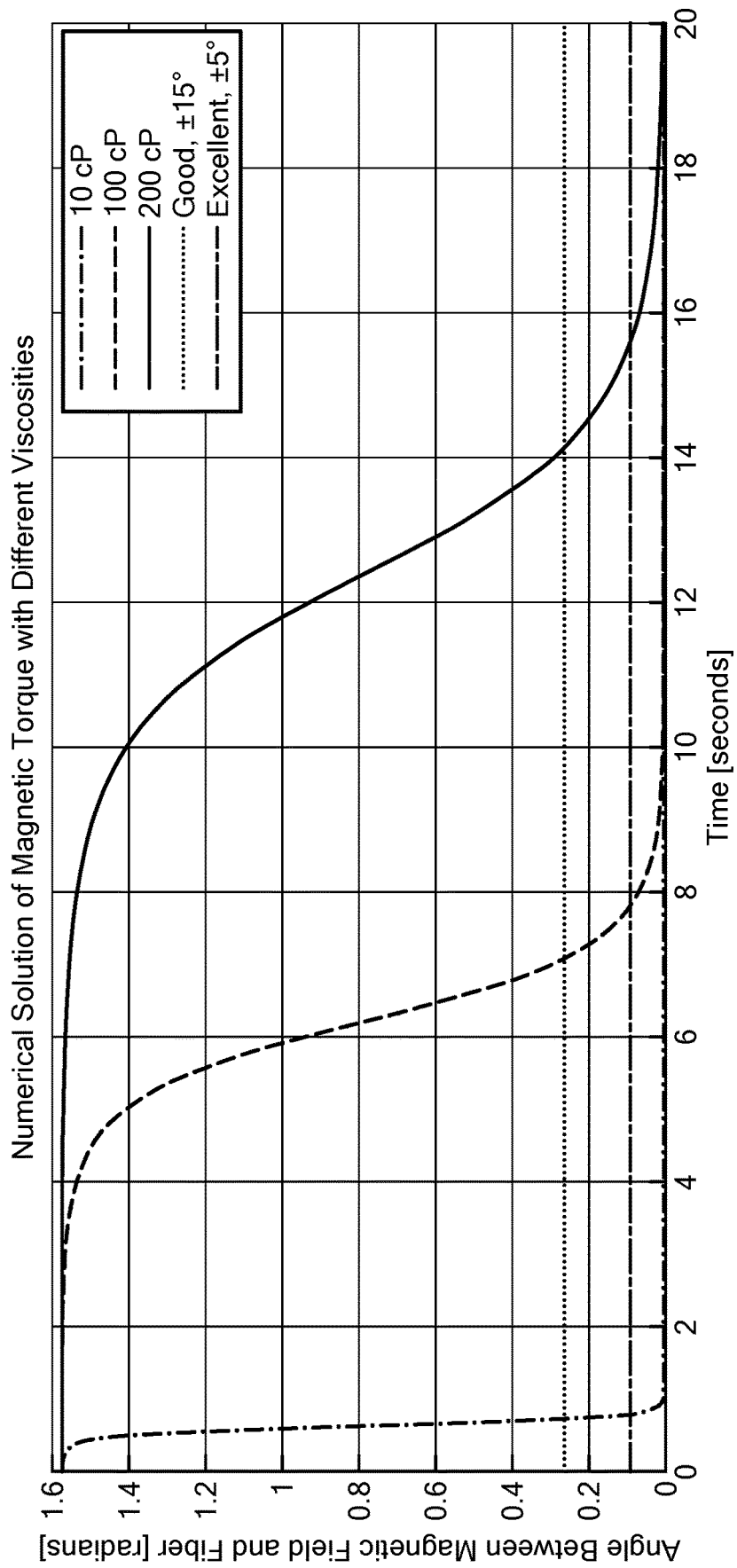
FIG. 31 is a graph of numerical solutions of magnetic torque with different viscosities.

As shown in FIG. 31, alignment time increased significantly as fluid viscosity increased. Thus, fluids with viscosities under 100 cP can be used with current field strengths in order to achieve low alignment times.

The simulation modeled the worst case alignment scenario of aligning a rod that is initially perpendicular to the magnetic field direction. Based on the models, it is apparent that the slowest period of alignment occurs when the rod is nearly perpendicular to the magnetic field direction. At this position, the rod has a low magnetic torque and is momentarily stable before it begins rotating in one direction.

This observation may be used to decrease alignment times in high viscosity fluids. By applying a dynamic magnetic field which reduces the attack angle between the applied magnetic field and fiber direction, magnetic torque can be increased and the fiber can align more quickly. This can be achieved by a magnetic field vector that is rotating conically about a central axis of desired alignment.

An angular magnetic field offset can decrease the attack angle on fibers that are aligned perpendicularly to the desired alignment direction. By rotating the field about the alignment axis and maintaining the offset angle, all worst case scenarios of initial fiber angles can be addressed and rod alignment time can be decreased.

Example 5

Figure 32:
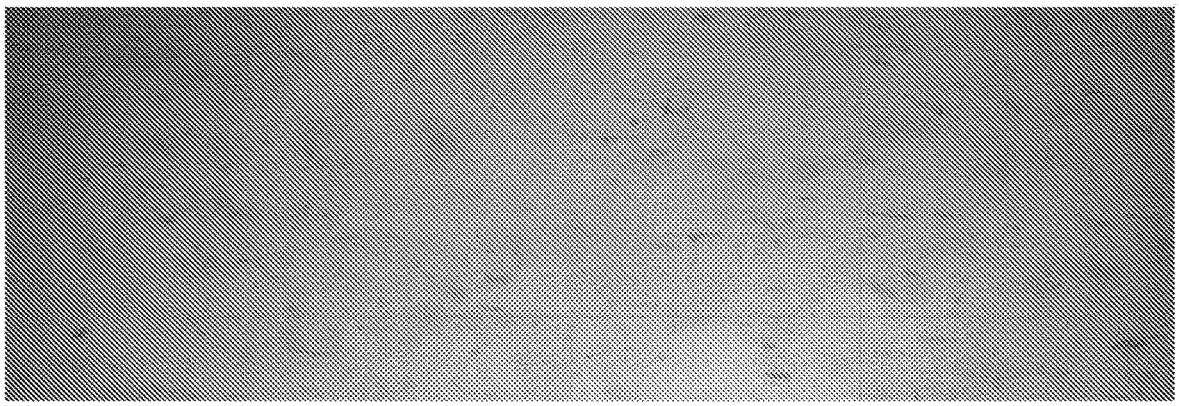
FIG. 32 is an image of a print test illustrating rod alignment in the X direction at the extrusion location.

The field direction of fibers at localized areas was determined by printing material and observing fiber alignment at a microscopic level. The solenoid control block was mounted under an optical microscope and alignment of magnetized fibers suspended in low viscosity solutions was observed. Excellent fiber alignment was observed at the extrusion location. See FIG. 32. Actual tolerances were difficult to determine due to manual alignment of the solenoid control block under the microscope. However, the alignment direction was observed to be within a few degrees of error.

Figure 33:
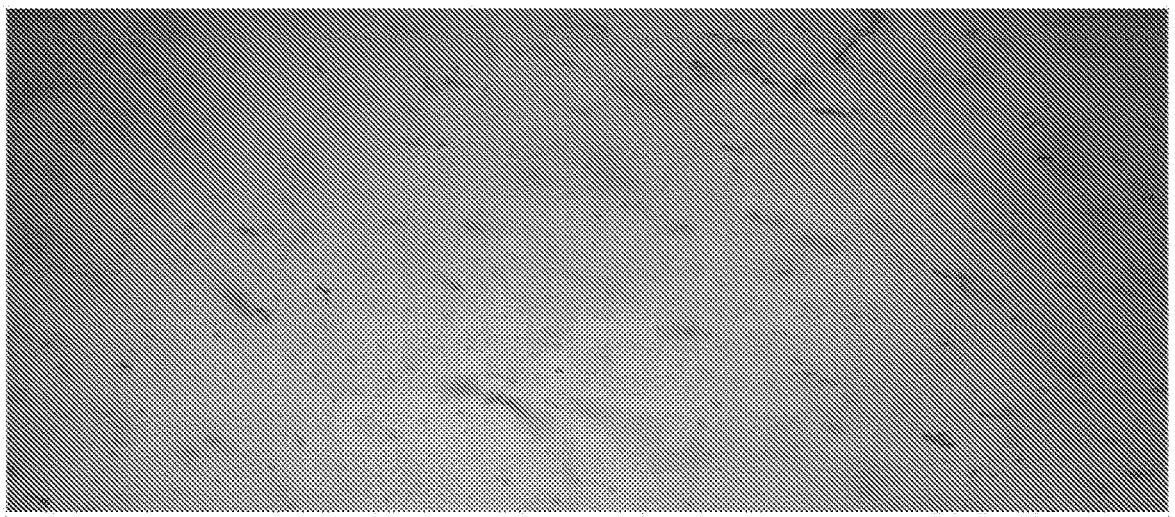
FIG. 33 is an image of a print test illustrating e direction rod alignment at a 4.5 mm radius.

To evaluate the alignment radius for achieving a tolerance of ±15°, the alignment of areas outside the printing location was observed. Based on observed alignment directions, the tolerance radius was determined to be 4 mm. As shown in FIG. 33, the alignment at this radius was close to 15° of the desired direction. At locations outside this alignment radius, error was greater than 15° different than the desired direction. This tolerance radius can be used to determine the printing speed parameters as described above.

Example 6

Figure 34:
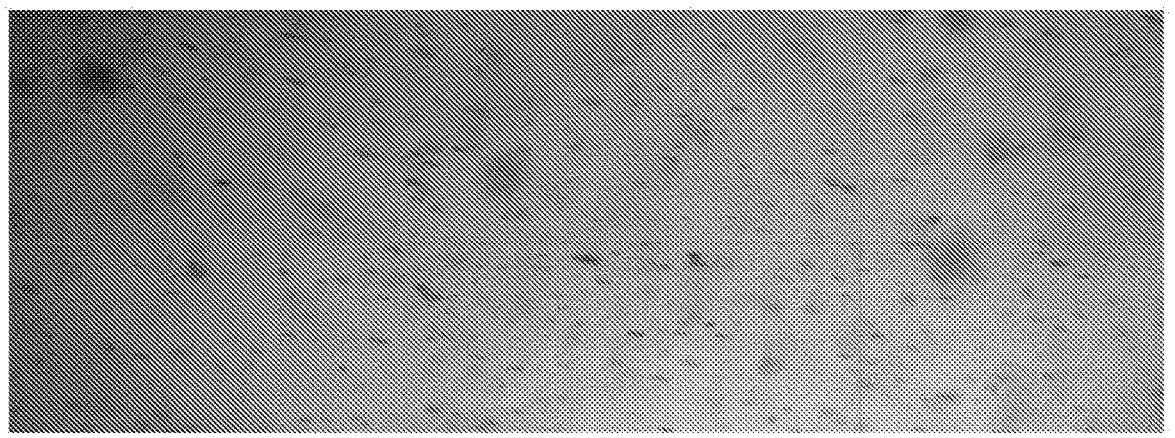
FIG. 34 is an image of a print test illustration XZ platelet alignment.

Platelet alignment using DC pulsing of perpendicular vectors was observed in the XY, XZ and YZ planes under an optical microscope. The platelets took longer to align than fibers due to increased viscous damping. Once aligned, platelets appeared to align within a few degrees of the desired alignment plane, as shown in FIG. 34, validating the technique of perpendicular field pulsing as an alignment method for magnetized platelets.

Example 7

Partial core solenoids were tested in the solenoid control system using extended partial cores with a diameter of 3/32". Fiber alignment with this system was observed under an optical microscope.

At the printing location, fiber alignment was observed to have comparable tolerances to the full core design. Alignment times were qualitatively observed to be slower than the full cores, indicating a weaker magnetic field. At a distance of 7 mm away from the printing location, there was no observable pattern of fiber alignment. This indicated that the magnetic field strength away from the printing location was not strong enough to cause fiber alignment.

These results suggest that the field is strong enough to align fibers at the printing location, where the alignment direction is tightly controlled. The field outside the alignment radius is significantly weaker and may not cause realignment error.

Example 8

The prototype pumping system was tested with a 25 mL syringe and a 1.0 mL syringe. The smaller volume syringe was used to increase the pressure in the system, which decreased potential issues while working with viscous fluids and decreased the minimum flow rate from 9.4 mL/hr to 0.375 mL/hr. The slower flow rate increased the available time for the solenoids to orient fibers during printing. The direct-write printer successfully printed a smooth line that did not puddle with the syringe pump running at this flow rate.

Example 9

A smaller voxel size results in a high printer resolution. A factor affecting voxel size is the inner diameter of the dispensing tip at the end of the fluidic system which dispenses the liquid solution onto the print bed. In some embodiments, the device has a voxel size of 100-250 microns. A dispensing tip with an inner diameter equal to the target voxel size can be used. However, the maximum force producible by the syringe pump due to pressure drop across the nozzle tip should not be exceeded to avoid damage to the syringe pump and a consistent flow rate from the dispensing tip.

To ensure that no damage occurs to the syringe pump and a consistent flow rate is achieved from the tip, a theoretical model was built to simulate flow under various conditions. The dispensing tip inner diameter profile d, tip length L, material solution density ρ, viscosity μ, and flow rate Q were used to calculate the drop in pressure ΔP across the system using Poiseuille's equation, shown below. The pump does not fail as long as the pressure drop does not exceed the pressure created by the force of the syringe plunger acting on the fluid in the syringe pump.

$$\Delta P = \frac{128 \mu L Q}{\pi d^4}$$

The materials glycerol and corn syrup were used for preliminary calculations, with corn syrup having the higher viscosity of approximately 2000 centipoise (cP). Using a 200 micron (0.200 mm) tapered dispensing tip and a flow rate of 10 mL/hr, there was a pressure drop of 0.043 MPa. This is equivalent to 25% of the pressure produced while using a 25 mL syringe and therefore showed that the system acted as desired. Straight dispensing tips were tested using this model and were found to exceed the pressure limits of this syringe pump and were not used in these experiments.

Figure 35:
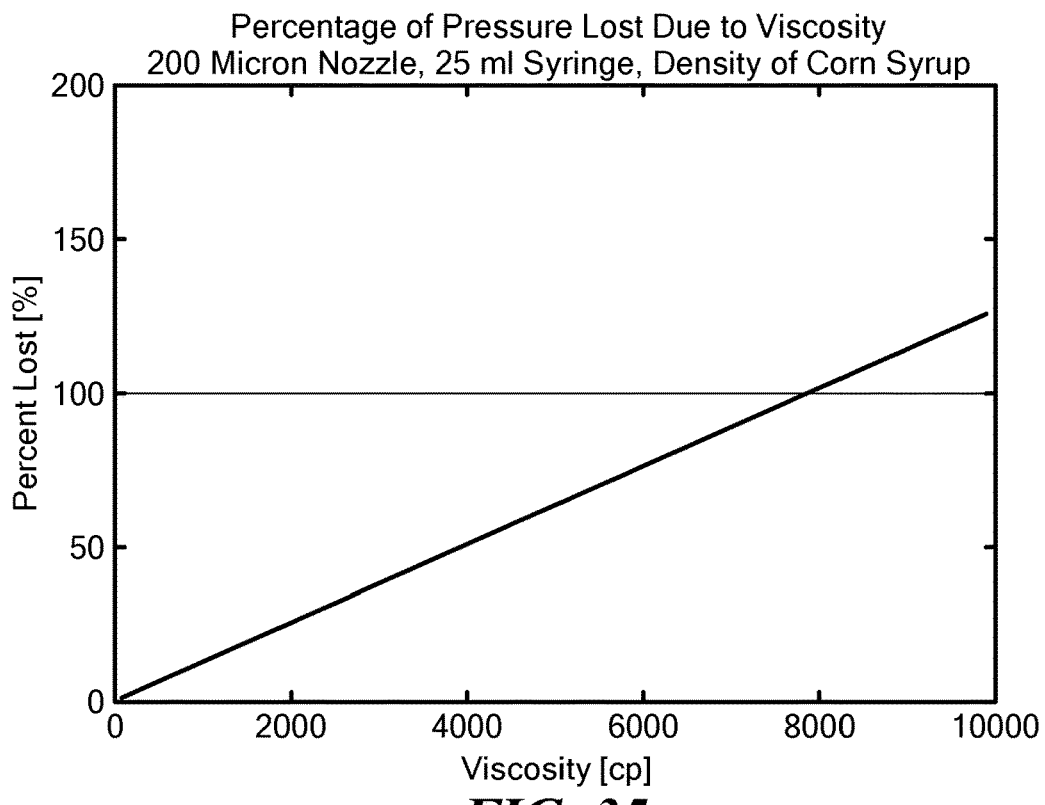
FIG. 35 is a graph illustrating percentage of pressure lost due to viscosity.
Figure 36:
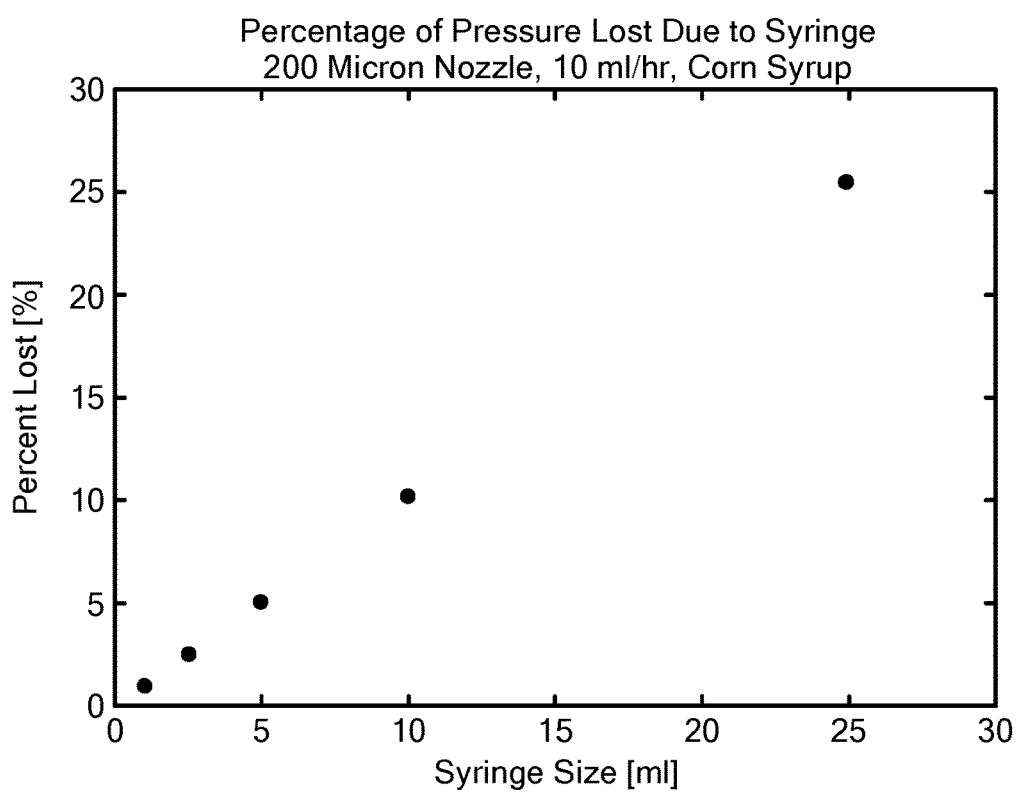
FIG. 36 is a graph illustrating percentage of pressure lost due to syringe size.

An investigation of the relation of viscosity and pressure drop was performed. FIG. 35 shows that under the conditions tested, pressure was exceeded at around 8000 cP. However, FIG. 36 shows that a change of syringe can result in a reduced pressure drop, allowing the use of nearly any viscosity fluid. This comparison shows that the replacement of the 25 mL syringe with the 1 mL syringe increases the system pressure sufficiently so that there is little to no concern for print failure due to pressure loss in any material or tip configuration.

Figure 37:
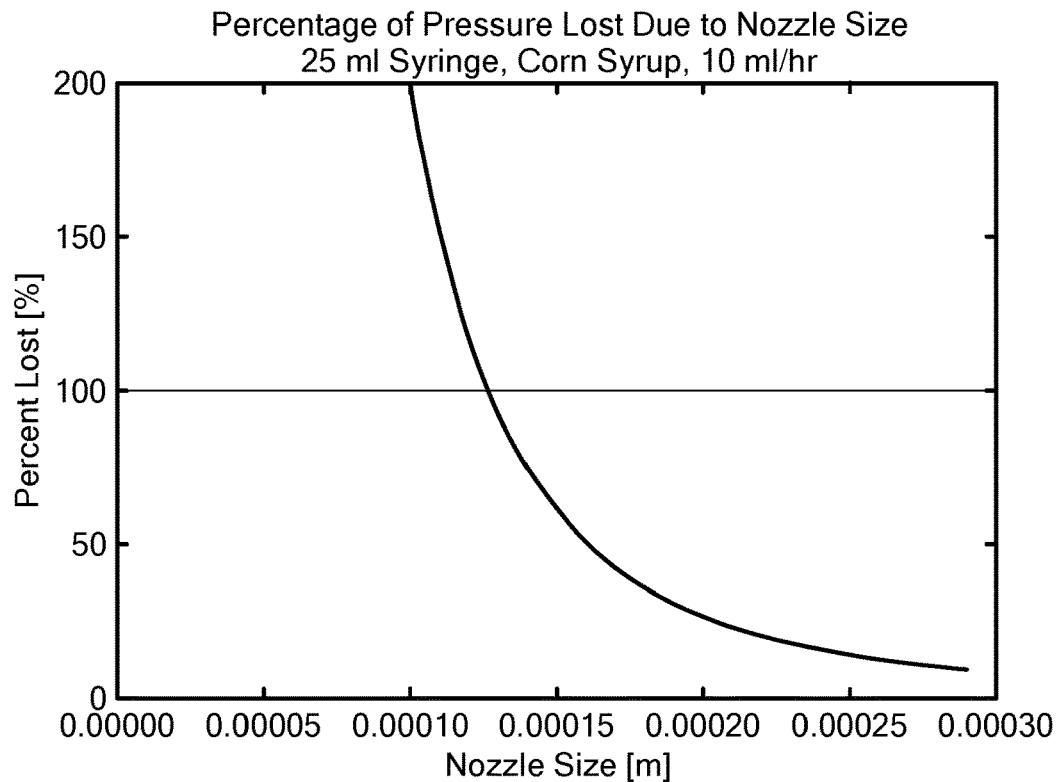
FIG. 37 is a graph illustrating percentage of pressure lost doe to nozzle size.

For voxel sizes less than 200 microns, smaller dispensing tips can be used, at a cost of pressure drop. There is a relation to the power of 4 between pressure drop and dispensing tip diameter as seen in FIG. 37. While a 200 micron nozzle reduces final pressure by 25%, a 100 micron nozzle reduces it by 200%.

Figure 38:
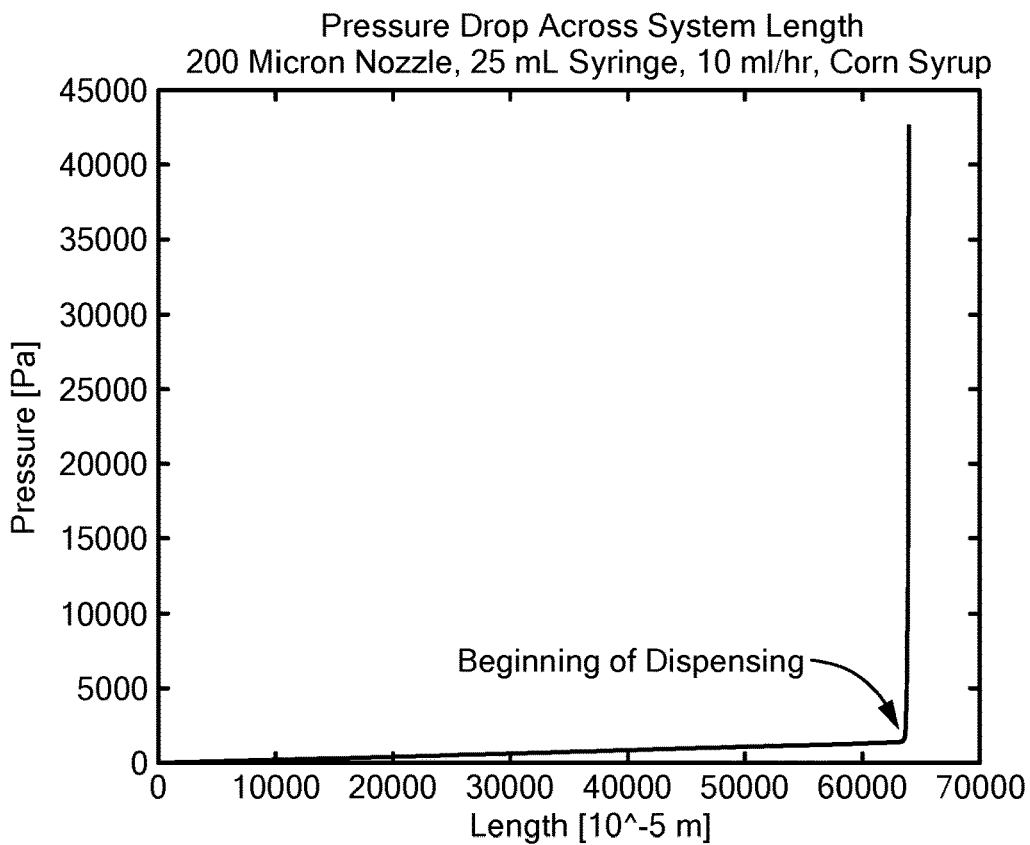
FIG. 38 is a graph illustrating percentage of pressure drop across system length.

FIG. 38 illustrates the assumption that the pressure drop due to length and diameter of the tube is not negligible, but is insignificant in comparison to that of the pressure drop due to the dispensing tip.

Example 10

Figure 39:
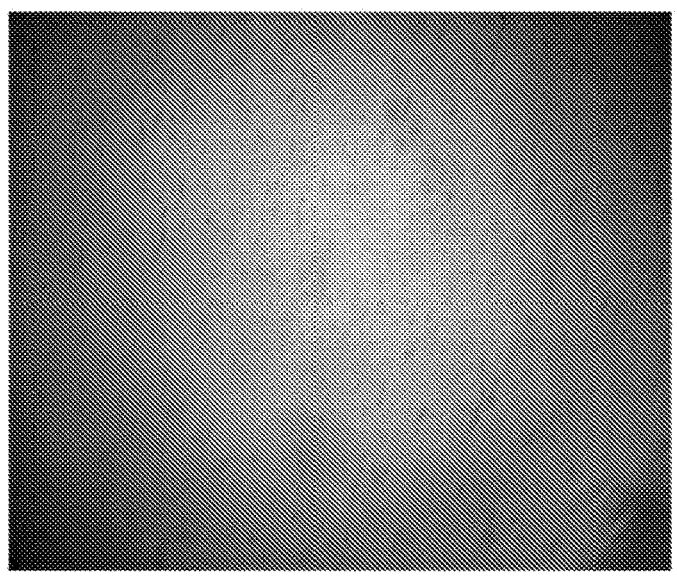
FIG. 39 is an image of a point of material dispensed from a print head illustrating alignment of rods within the material in the Y direction.

In a test of printing an object, the syringe pump was filled with a precursor material containing magnetically responsive rods, and a single point of material was dispensed from the print head. The magnetic alignment system was programmed to align the rods within the material in the y-direction. FIG. 39 is an image illustrating successful alignment of the rods.

Example 11

Figure 40:
FIG. 40 is an image of a circular print test illustrating consistent alignment of rods in the Y direction.

A circular print test was performed to determine if fibers can be aligned within a radius of about 4.5 mm. This test print was a single layer print of a circle of radius 2.5 mm. The procedure for this print was to print the circular part with the magnetic alignment system actively and constantly targeting the print location to align the rods within the material, and to return the print head to the center of the circle after a completed print with the alignment system is still active. The print head would target the center of the circle until the material was visually identified as having cured. With a print speed of 5 mm/s and a material flow rate of 0.625 mm³/s, a successful circle with rods consistently aligned in the y-direction was printed. Because shear forces on the rods as they exit the printing nozzle naturally align the fibers along the direction of the print head motion, the image in FIG. 40 captures a spot near the bottom of the circle where the printer's motion was in the x-direction. This confirms that alignment in the part is due to the magnetic field applied at the print location and not due to shear forces. The successful alignment of fibers in this test print confirms that the system can successfully align fibers within the experimental radius.

Example 12

To further investigate the parameters required to align fibers within a printed part, considering rate of change of viscosity of the material, print layer thickness, print speed, and material flow rate, single lines of material were printed. The first series of tests attempted to align all fibers in the printed line in the same direction. For each test, a line was printed in the x-direction at a certain print speed and material flow rate with the magnetic alignment system actively and constantly targeting the print location to align rods in the y-direction. The line was longer than the experimentally determined alignment radius. The print head paused at the end of the line and continued targeting the print location with the magnetic field until the material was visually confirmed as having cured. By testing in this manner, alignment of the rods at the beginning of line could be compared to the alignment of the rods within the alignment radius at the end of the line once the print head stopped.

With test parameters set at a print speed of 5 mm/s and 0.625 mm³/s, the fibers within the alignment radius of the print head's stationary location at the end of the print were observed as aligned, while the fibers throughout the rest of the print presented inconsistent alignment patterns. This failure to align is caused by realignment of the rods as the material is exposed to inconsistent magnetic fields outside of the target location. The previously printed material remained at a low enough viscosity for rod alignment to be affected by these fields as the print head moved along the part, even though the robs may have been properly aligned while being targeted.

Figure 41:
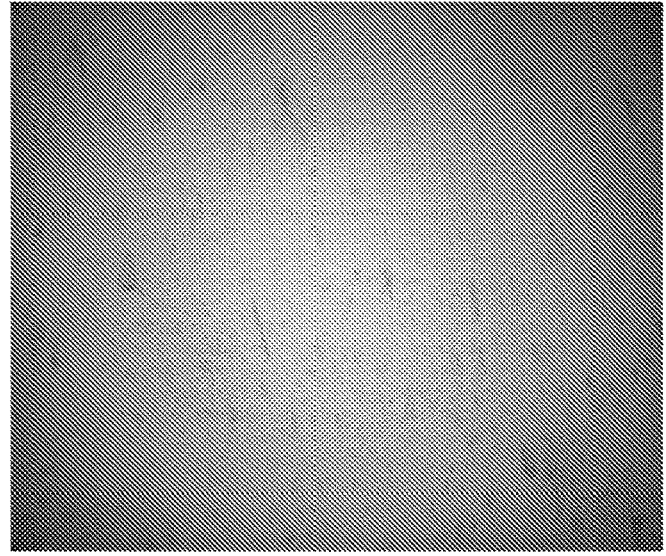
FIG. 41 is an image of a line print test illustrating consistent alignment throughout.

To optimize rod alignment and reduce misalignment outside of the targeted print location. The print speed was progressively reduced and the flow rate was proportionally adjusted to maintain a consistent print layer thickness. By slowing down the print speed, previously printed material moved away from and outside of the alignment radius at a slower rate, allowing the material to cure and reach a high enough viscosity to prevent subsequent misalignment once the material was subject to fields outside of the alignment zone. By setting the print speed to 0.5 mm/s, the rods throughout a printed line were successfully aligned, confirming that alignment was successfully occurring throughout the print process. See FIG. 41.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

APPENDIX

Syringe Pump Arduino Code
   IntegrationTest_IOSwitch

```
//Used to allow the printer to control the syringe pump.
//Connect the other end of the STEP pin and DIR pin as
// well as a ground to the respective labeled pins on
// the printer's top motor driver pins
byte stepPin = 13;
byte dirPin = 9;
byte stopPin = 10;
int flag = 0;
int switchState = 0;
int prevSwitchState = 0;
int pause = 0;
int dirState;
int prevDirState;
//int pwm_value;
int pulse_length;
void setup( ) {
  pinMode(stepPin, INPUT);
  pinMode(dirPin,INPUT);
  pinMode(stopPin, INPUT);
  Serial.begin(9600);
  delay(2000);
  sendCommand("ON0V400A6000N2IV300A46500V5"); //Setup syringe pump
}
void loop( ){
  switchState = digitalRead(stopPin);
  dirState = digitalRead(dirPin);
```

```
if (flag == 0){
  pulse_length = pulseIn(stepPin, HIGH); //0-2000 microseconds
  if (pulse_length > 1 && dirState == LOW){
    sendCommand("A0"); //A0
    flag = 1;
  }
}
if (dirState == HIGH && flag == 1){
  sendCommand("T"); //T
  delay(100);
  //sendCommand("R200"); //SuckBack
  flag = 0;
  pause = 1;
}
if (switchState != prevSwitchState) {
  if (switchState == LOW) {
    sendCommand("T"); //T
  }
}
prevSwitchState = switchState;
}
void sendCommand(String command){
  Serial.write(0x2F);
  Serial.write('1');
  for (int i = 0; i < command.length( ); i++){
    char letter = command[i];
    Serial.write(letter);
  }
  Serial.write('R');
  Serial.write(0x0D);
}
```

PumpControlwLCD_IOSwitch

```
//Control of Tecan Cavro XLP6000
//Setup Breadboard as shown in diagram:
//https://flic.kr/p/zXDVr7
//If there are problems with upload, particularly related to
"avrdude", remove wire from 0 pin during upload
#include <LiquidCrystal.h>
LiquidCrystal lcd(12, 11, 5, 4, 3, 2);
const int switchPin = 6;
const int switchPin2 = 10;
int switchState = 0;
int prevSwitchState = 0;
int switchState2 = 0;
int prevSwitchState2 = 0;
int switchState3 = 0;
int prevSwitchState3 = 0;
String command;
String commandOut;
String name;
int comState = 0;
int sensorPin = A4;
int sensorValue = 0;
int prevSensorValue = 0;
int maxBytes = 0;
int count = 0;
int bytesAvail;
byte stepPin = 13;
byte dirPin = 9;
byte stopPin = 10;
int flag = 0;
int pulse_length;
int axe = 0;
int dirState;
int prevDirState;
int pause = 0;
int totalPrograms = 12; //add to this when writing a
new program
int debugFlag = 0; //Turn to 0 if screen is acting weird,
turn to 1 to use debug code space
void setup( ) {
  Serial.begin(9600);
  lcd.begin(16, 2);
  pinMode(switchPin,INPUT);
  pinMode(switchPin2,INPUT);
  lcd.print("Tecan Cavro");
  lcd.setCursor(0, 1);
  lcd.print("XLP6000");
  delay(4000);
  lcd.clear( );
  lcd.setCursor(0, 0);
  lcd.print("Select Program:");
}
void loop( ) {
  switchState = digitalRead(switchPin);
  switchState2 = digitalRead(switchPin2);
  sensorValue = analogRead(sensorPin);
  if (sensorValue != prevSensorValue) {
    if (sensorValue < (1*1024/totalPrograms)) {
      commandOut = "IOIO";
      name = "Test      ";
    }
    else if (sensorValue < (2*1024/totalPrograms)) {
      commandOut = "N0ZOA6000IA0";
      name = "Demo      ";
    }
    else if (sensorValue < (3*1024/totalPrograms)) {
      commandOut = "N0Z";
      name = "Initialize   ";
    }
    else if (sensorValue < (4*1024/totalPrograms)) {
      commandOut = "OA6000";
      name = "Fill       ";
    }
    else if (sensorValue < (5*1024/totalPrograms)) {
      commandOut = "IA0";
      name = "Dispense    ";
    }
    else if (sensorValue < (6*1024/totalPrograms)) {
      commandOut =
"OA6000IA0OA6000IA0OA6000IA0OA6000IA0OA6000IA0OA6000IA0OA6000IA0OA6000IA0";
      name = "Cycle    "i;
    }
    else if (sensorValue < (7*1024/totalPrograms)) {
      commandOut = "OA0IV100A6000";
      name = "Aspirate    ";
    }
    else if (sensorValue < (8*1024/totalPrograms)) {
      commandOut = "N2V5IOIO";
      name = "Set Speed Low ";
    }
    else if (sensorValue < (9*1024/totalPrograms)) {
      commandOut = "N2V300IOIO";
      name = "Set Speed Medium";
    }
    else if (sensorValue < (10*1024/totalPrograms)) {
      commandOut = "N0V400IOIO";
      name = "Set Speed High ";
    }
    else if (sensorValue < (11*1024/totalPrograms)) {
      commandOut = "N2V5D25";
      name = "Pump Micro   ";
    }
    else if (sensorValue < (12*1024/totalPrograms)) { //SHOWTIME!!!
      commandOut = "Showtime";
      name = "Run Printer    ";
    }
    lcd.setCursor(0, 1);
    lcd.print(name);
  }
  if (switchState != prevSwitchState) {
    if (switchState == LOW) {
      if (commandOut == "Showtime"){
        runPump( );
      }
      else {
        command = commandOut;
        sendCommand(command);
      }
    }
  }
  if (switchState2 != prevSwitchState2) {
    if (switchstate2 == LOW) {
```

```
    sendCommand("T");
  }
}
prevSwitchState = switchState;
prevSwitchState2 = switchState2;
if (debugFlag== 1){
  debug( );
}
}
void runPump( ){
  sendCommand("ON0V400A6000N2IV300A46500V30"); //Set up Pump
  axe = 0;
  while (axe == 0){ //repeat until button is pressed
    switchState3 = digitalRead(stopPin);
    dirState = digitalRead(dirPin);
    if (flag == 0){
      pulse_length = pulseIn(stepPin, HIGH); //0-2000 microseconds
      if (pulse_length > 1 && dirState == LOW){
        sendCommand("A0"); //Run until empty or stop command
        flag = 1;
      }
    }
    if (dirState == HIGH && flag == 1){
      sendCommand("T"); //Stop
      delay(100);
      //sendCommand("R200"); //SuckBack
      flag = 0;
      pause = 1;
    }
    if (switchState3 != prevSwitchState3) {
      if (switchState3 == LOW) {
        sendCommand("T"); //Stop
        axe = 1;
      }
    }
    prevSwitchState3 = switchState3;
  }
}
void sendCommand(String command){
    Serial.write(0x2F);
    Serial.write('1');
    for (int i = 0; i < command.length( ); i++){
      char letter = command[i];
      Serial.write(letter);
    }
    Serial.write('R');
    Serial.write(0x0D);
}
void debug( ){
  if (Serial.available( ) > 0) {
    bytesAvail = Serial.available( );
    if (bytesAvail > maxBytes){
      maxBytes = bytesAvail;
      char byteArray[maxBytes];
      count = 0;
      lcd.setCursor(0, 0);
      lcd.print("           ");
    }
    //byteArray[count] = Serial.read( );
    if (count<15){
      char byte1 = Serial.read( );
      Serial.println(byte1);
      lcd.setCursor(0, count);
      lcd.print(byte1);
    }
    else{
      Serial.read( );
    }
    lcd.setCursor(11,1);
    lcd.print(maxBytes);
    lcd.setCursor(14,1);
    lcd.print(bytes Avail);
    count++;
  }
}
```

Syringe Pump Python Code
PressureDrop

```
#Use to characterize pressure drop in the fluid system to avoid pump failure
from __future__ import division
import math
#import matplotlib.pyplot as plt
#from matplotlib.legend_handler import HandlerLine2D
#Constants
conv = .0254 #in to mm
tipD0 = .00432 #Tip diameter m
syrV = .06 #m/s
tipLen = 0.039*conv #m(conv) (for straight tips)
pumpF = 66.7 #N
#Calculation Variables (Elmer's)
syrVol = 1 #syringe Volume ml
Q0 = .375 #flow rate ml/hr (test = 10) #V7 = 10.5 ml/hr #maxOut ~ 600ml/hr = V400 S16 #maxIn ~ 6000ml/hr = V4000 S3
rho = 1380 #density kg/m^3 (cs=1380)
u = 300 #viscosity centipoise (cs=2000)
tipDF = .000280 #voxel size
tubeLen = 36*conv #m(conv)
tubeD = .125*conv #m(conv)
inc = .00001 #integration increment
stepVol = syrVol/6000 #amount of volume moved during each step
#Adjusted Fluidic Values
Q = Q0/(100**3*3600) #flow rate m^3/s
u = u*.001 #kg/ms
syrA = (syrVol/100**3)/syrV
syrP = pumpF/syrA #pressure in syinge Pa
VSpeed = Q0/(syrVol/6000)/3600 #Flow rate * s/hr * (volume of syringe / steps per stroke length)
def pressureDrop(rho,u,L,D,Q): #density, viscosity, section length, section d, fluid velocity
    Re = rho*(Q/(3.1415*D**2/4))*D/u
    if Re < 2000:
        deltaP = (128*u*L*Q)/(3.1415*D**4)
        return deltaP
    else:
        raise NameError('Flow Not Laminar')
def printThings(syrP,deltaP,VSpeed,vol=0):
    print 'Fluid pressure in syringe: ' + str(syrP/1000000) + ' MPa'
```

```
        print 'Pressure drop: ' + str(deltaP/1000000) + ' MPa'
        print 'Percent Pressure Loss: ' + str(deltaP/syrP*100) + '%'
        if vol != 0:
            print 'Fluid volume in tube: ' + str(vol*100**3) + ' ml'
        print 'Use V speed code: V' + str(int(VSpeed))
def getPlungerInfo(syrVol = syrVol):
        print 'Plunger area = ' + str(syrA) + ' m^2'
        syrD = math.sqrt((syrA*4)/3.1415)
        print 'Plunger diameter = ' + str(syrD) + ' m'
def printSolution(Q0 = Q0):
        VSpeed = Q0/(syrVol/6000)/3600 #recalculate VSpeed
        Q = Q0/(100**3*3600) #recalculate Q m^3/s):
        lengths = [tubeLen,inc,.01257,.0183] #Lengths of integrated sections
        slopes = [0,(tipD0-tubeD)/inc,0,((tipDF-tipD0)/lengths[3])] #linear diameter change along
respective section. Use this for 10/31 setup [(tipD0-tubeD)/inc,0,((tipDF-tipD0)/lengths[3])]
        D = tubeD #first D
        deltaP = 0
        vol = 0
        if len(lengths) != len(slopes): #check for correct input pair
            raise NameError('lengths/slopes inputs do not match')
        for i in range(len(lengths)): #run each section
            for j in range(int(math.floor(lengths[i]/inc))): #run each increment of that section
                D = D + slopes[i]*inc
                deltaP = deltaP + pressureDrop(rho,u,inc,D,Q)
                vol = vol + 3.1415*D**2*inc/4
        printThings(syrP,deltaP,VSpeed,vol)
def printTubeOnly(Q = Q0):
        VSpeed = Q/(syrVol/6000)/3600 #recalculate VSpeed
        Q = Q/(100**3*3600) Recalculate Q m^3/s
        lengths = [tubeLen] #Lengths of integrated sections
        slopes = [0] #linear diameter change along respective section. Use this for 10/31 setup [(tipD0-
tubeD)/inc,0,((tipDF-tipD0)/lengths[3])]
        D = tubeD #first D
        deltaP = 0
        vol = 0
        if len(lengths) != len(slopes): #check for correct input pair
            raise NameError('lengths/slopes inputs do not match')
        for i in range(len(lengths)): #run each section
            for j in range(int(math.floor(lengths[i]/inc))): #run each increment of that section
                D = D + slopes[i]*inc
                deltaP = deltaP + pressureDrop(rho,u,inc,D,Q)
                vol = vol + 3.1415*D**2*inc/4
        printThings(syrP,deltaP,VSpeed,vol)
def printTipOnly( ):
        lengths = [tubeLen,inc,.01257,.0183] #Lengths of integrated sections
        slopes = [0,(tipD0-tubeD)/inc,0,((tipDF-tipD0)/lengths[3])] #linear diameter change along
respective section. Use this for 10/31 setup [(tipD0-tubeD)/inc,0,((tipDF-tipD0)/lengths[3])]
        D = tubeD #first D
        deltaP = 0
        vol = 0
        if len(lengths) != len(slopes): #check for correct input pair
            raise NameError('lengths/slopes inputs do not match')
        for i in range(len(lengths)): #run each section
            for j in range(int(math.floor(lengths[i]/inc))): #run each increment of that section
                D = D + slopes[i]*inc
                deltaP = deltaP + pressureDrop(rho,u,inc,D,Q)
                vol = vol + 3.1415*D**2*inc/4
        printThings(syrP,deltaP,VSpeed,vol)
def printQ(Vspeed):
        Qc = Vspeed * 3600* (syrVol/6000)#Flow rate * s/hr * (volume of syringe / steps per stroke
length)
        print str(Qc) + ' ml/hr'
def printSSpeed(VSpeed):
        if VSpeed >= 2600:
            SSpeed = 10.538 - .0017*VSpeed
        elif VSpeed >= 400:
            SSpeed = 18 - .005*VSpeed
        elif VSpeed >= 30:
            SSpeed = 37 - .1*VSpeed
        elif VSpeed >= 10:
            SSpeed = 45 - .5*VSpeed
        else:
            raise NameError('Too Small')
        SSpeed = int(SSpeed)
        print 'S' + str(SSpeed)
def graphPressureOverLength(Q0 = Q0):
        VSpeed = Q0/(syrVol/6000)/3600 #recalculate VSpeed
        Q = Q0/(100**3*3600) #recalculate Q m^3/s):
        lengths = [tubeLen,inc,.01257,.0183] #Lengths of integrated sections
```

```
        slopes = [0,(tipD0-tubeD)/inc,0,((tipDF-tipD0)/lengths[3])] #linear diameter change along
respective section
        pressure = [ ]
        if len(lengths) != len(slopes): #check for correct input pair
            raise NameError('lengths/slopes inputs do not match')
        for j in [475,2000]:
            u = j*.001
            P = [0]
            MaxP = [0]
            D = tubeD #first D
            deltaP = 0
            vol = 0
            for i in range(len(lengths)): #run each section
                for j in range(int(math.floor(lengths[i]/inc))): #run each increment of that section
                    D = D + slopes[i]*inc
                    deltaP = pressureDrop(rho,u,inc,D,Q)
                    P.append(P[-1]+deltaP)
                    vol = vol + 3.1415*D**2*inc/4
                    MaxP.append(syrP)
                    pressure.append(P)
        print pressure[0][-1]
        #plt.plot(P,'b')
        plt.plot(P,'b',MaxP,'r')
        plt.title('Pressure Drop Across System Length\nTapered Dispensing Tip, 200 Micron Nozzle, 25
mL Syringe, 10 ml/hr, Corn Syrup')
        plt.ylabel('Pressure [Pa]')
        plt.xlabel('Length [10^-5 m]')
        plt.show( )
def graphNozzleEffect( ):
    final = [ ]
    tiplen1 = .01257
    tipLenMaster = [.0183+tiplen1,.25*conv]
    for m in [0,1]:
        varRange = range(0,30)
        for i in range(len(varRange)):
            varRange[i] = varRange[i]/100000
        Output = [ ]
        threshold = [ ]
        for k in varRange:
            threshold.append(100)
            tipDF = k
            tipD0Master = [tipD0,tipDF]
            GlobTipD0 = tipD0Master[m]
            D = tubeD #first D
            deltaP = 0
            vol = 0
            lengths = [tubeLen,inc,tiplen1,tipLenMaster[m]-tiplen1] #Lengths of integrated sections
            slopes = [0,(tipD0-tubeD)/inc,0,((tipDF-GlobTipD0)/lengths[3])] #linear diameter change
along respective section
            if len(lengths) != len(slopes): #check for correct input pair
                raise NameError('lengths/slopes inputs do not match')
            for i in range(len(lengths)): #run each section
                for j in range(int(math.floor(lengths[i]/inc))): #run each increment of that section
                    D = D + slopes[i]*inc
                    deltaP = deltaP + pressureDrop(rho,u,inc,D,Q)
                    vol = vol + 3.1415*D**2*inc/4
            Output.append(deltaP/syrP*100)
        final.append(Output)
    tapered = plt.plot(varRange,final[0], label = 'Tapered Dispensing Tip ID')
    straight = plt.plot(varRange,final[1], 'g', label = 'Straight Dispensing Tip ID')
    threshold = plt.plot(varRange,threshold,'r', label = 'Threshold of Pump Failure')
    plt.title('Percentage of Pressure Lost Due to Dispensing Tip Inner Diameter\nTapered Dispensing
Tip, 25 ml Syringe, Corn Syrup, 10 ml/hr')
    plt.axis([0,.0003,0,200])
    plt.ylabel('Percent Pressure Loss [%]')
    plt.xlabel('Nozzle Size [m]')
    plt.legend( )
    plt.show( )
def graphSyringeEffect( ):
    lengths = [tubeLen,inc,.01257,.0183] #Lengths of integrated sections
    slopes = [0,(tipD0-tubeD)/inc,0,((tipDF-tipD0)/lengths[3])] #linear diameter change along
respective section
    varRange = [1,2.5,5,10,25]
    Output = [ ]
    for k in varRange:
        syrVol = k
        syrA = (syrVol/100**3)/syrV
        syrP = pumpF/syrA
        D = tubeD #first D
```

```
        deltaP = 0
        vol = 0
        if len(lengths) != len(slopes): #check for correct input pair
            raise NameError('lengths/slopes inputs do not match')
        for i in range(len(lengths)): #run each section
            for j in range(int(math.floor(lengths[i]/inc))): #run each increment of that section
                D = D + slopes[i]*inc
                deltaP = deltaP + pressureDrop(rho,u,inc,D,Q)
                vol = vol + 3.1415*D**2*inc/4
        Output.append(deltaP/syrP*100)
    plt.plot(varRange,Output,'ro')
    plt.title('Percentage of Pressure Lost Due to Syringe\nTapered Dispensing Tip, 200 Micron Dispensing Tip, 10 ml/hr, Corn Syrup')
    plt.axis([0,30,0,30])
    plt.ylabel('Percent Pressure Lost [%]')
    plt.xlabel('Syringe Size [ml]')
    plt.show( )
def graphViscosityEffect( ):
    varRange = range(1,100)
    for i in range(len(varRange)):
        varRange[i] = varRange[i]*.1
    Output = [ ]
    for k in varRange:
        u = k
        D = tubeD #first D
        deltaP = 0
        vol = 0
        lengths = [tubeLen,inc,.01257,.0183] #Lengths of integrated sections
        slopes = [0,(tipD0−tubeD)/inc,0,((tipDF−tipD0)/lengths[3])] #linear diameter change along respective section
        if len(lengths) != len(slopes): #check for correct input pair
            raise NameError('lengths/slopes inputs do not match')
        for i in range(len(lengths)): #run each section
            for j in range(int(math.floor(lengths[i]/inc))): #run each increment of that section
                D = D + slopes[i]*inc
                deltaP = deltaP + pressureDrop(rho,u,inc,D,Q)
                vol = vol + 3.1415*D**2*inc/4
        Output.append(deltaP/syrP*100)
    for i in range(len(varRange)):
        varRange[i] = varRange[i]*1000
    plt.plot(varRange,Output)
    plt.title('Percentage of Pressure Lost Due to Viscosity\nTapered Dispensing Tip, 200 Micron Nozzle, 25 ml Syringe, Density of Corn Syrup')
    plt.axis([0,10000,0,200])
    plt.ylabel('Percent Pressure Lost [%]')
    plt.xlabel('Viscosity [cp]')
    plt.show( )
```

PumpSerialCom

```
#Use to communicate with syringe pump with the Cavro integration kit
import serial
#734604 Cavro Part Number
PORT = "COM4" #found in computer Device Manager
pumpAddress = 0 #on circle on pump
pump = serial.Serial(PORT,9600,bytesize=8, parity='N', stopbits=1,timeout = 0)
quitflag = 0
def buildStr(command):
    string = '\x2F\x31'
    string = string + command
    string= string + 'R\x0D'
    return string
def setSpeed(speed):
    Vspeed = rawSpeed*(4)
    if Vspeed >= 2600:
        Sspeed = 10.538 − .0017*Vspeed
    elif Vspeed >= 400:
        Sspeed = 18 − .005*Vspeed
    elif Vspeed >= 30:
        Sspeed = 37 − .1*Vspeed
    elif Vspeed >= 10:
        Sspeed = 45 − .5*Vspeed
    else:
        raise NameError('Too Small')
    Sspeed = int(Sspeed)
    return Vspeed, Sspeed
#Set Speed and Initialize
'''rawSpeed = input('Speed(ml/hr)(>5): ')
Vspeed, Sspeed = setSpeed(rawSpeed)
command = buildByteArray('Z' + str(Sspeed))
pump.write(command)
command = buildByteArray('S' + str(Sspeed))
pump.write(command)
'''
answerList = [ ]
errorList = [ ]
error = {97: 'Initialization',99: 'Invalid Operand'}
while quitflag == 0:
    #Send Command
    commandIn = raw__input('Command: ')
    if commandIn == 'E': #Type E to exit program and close serial port
        quitflag = 1
        commandIn = ''
    command = buildStr(commandIn)
    pump.write(command)
    #Receive Answer
    answer = pump.read(10)
    if len(answer) > 2:
        errorCode = ord(answer[3])
```

```
        if errorCode in error:
            print error[errorCode]
        else:
            errorCode = ''
        answerCut = answer[4:-3]
        answerList.append(answerCut)
        errorList.append(errorCode)
        print answer
pump.close
```

Solenoid Control System Arduino Code
  Constants and Definitions for all Code

```
#include <math.h>
using namespace std;
float a = 1/sqrt(3);
float b = sin(atan(sqrt(2)));
float c = -b/2;
float d = 1/sqrt(2);
float sol[3][3] = {{0,b,a},{d,c,a},{-d,c,a}}; //Inverse of solenoid unit
vector matrix float direc[3];
float percent[3];
int pwm[3];
int r1=3; int c2=1; int i;
float pVec[3]; float pD1[3]; float pD2[3];
int mode=0; int n=1;
int switchTime=250; //time for each alternating platelet signal
float v1[3]; float v2[3]; float V[3];
float randV[3]={random(20),random(20),random(20)}; //Random vector
for platelet cross products float R;
int pctPWM=111;
// Solenoid Pins
int H1[3]={2,4,6};
int H2[3]={3,5,7};
int L1[3]={22,24,26};
int L2[3]={23,25,27};
```

Setup, Loop and Interpret Functions for Computer Control of Solenoids

```
void setup( )
{
    for(i=0;i<=2;i++)
    {
        pinMode(H1[i], OUTPUT);
        pinMode(H2[i], OUTPUT);
        pinMode(L1[i], OUTPUT);
        pinMode(L2[i], OUTPUT);
    }
    Serial.begin(9600);
    Serial.println("Enter the solenoid direction code: ");
}
void loop( )
{
    // Interpret the pwmValue if it is different from the previous
    pwmValue
    if (Serial.available( )>0)
    {
        char ch = Serial.read( );
        interpret(ch);
        n=0;
    }
    // If the alignment direction has been updated, power solenoids
    if (n==0)
    {
        n=1;
        // If system is in fiber mode
        if (mode==0)
        {
            normalize( );
            convert(direc);
            maximum( );
            power( );
        }
        // If system is in platelet mode
        if (mode==1)
        {
            platelets( );
            convert(pD2);
            maximum( );
            power( );
            delay(switchTime);
            b=1;
        }
    }
    // If system is in Platelet mode, alternate between normal pulsing
    vectors in intervals of switchTime
    if (mode==1)
    {
        if (b=1)
        {
            convert(pD1);
            maximum( );
            power( );
            Serial.println("90 degrees");
            delay(switchTime);
            b=2;
        }
        if (b=2)
        {
            convert(pD2);
            maximum( );
            power( );
            Serial.println("0 degrees");
            delay(switchTime);
            b=1;
        }
    }
}
// Compares ch value with library
// Assigns alignment direction
// Assigns alignment type (Platelets: mode=1, Fibers: mode=0;)
void interpret(char ch)
{
    if (ch=='A')
    {
        direc[0]=0;
        direc[1]=b;
        direc[2]=a;
        mode=0;
        Serial.println("Solenoid A");
    }
    if (ch=='Z')
    {
        direc[0]=0;
        direc[1]=-b;
        direc[2]=-a;
        mode=0;
        Serial.println("Solenoid A, Reverse");
    }
    if (ch=='B')
    {
        direc[0]=d;
        direc[1]=c;
        direc[2]=a;
        mode=0;
        Serial.println("Solenoid B");
    }
    if (ch=='C')
    {
        direc[0]=-d;
        direc[1]=c;
        direc[2]=a;
        mode=0;
        Serial.println("Solenoid C");
    }
    if (ch=='1')
    {
        direc[0]=1;
        direc[1]=0;
        direc[2]=0;
        mode=0;
        Serial.println("X Direction");
```

```
}
if (ch=='2')
{
    direc[0]=0;
    direc[1]=1;
    direc[2]=0;
    mode=0;
    Serial.println("Y Direction");
}
if (ch=='3')
{
    direc[0]=0;
    direc[1]=0;
    direc[2]=1;
    mode=0;
    Serial.println("Z Direction");
}
if (ch=='7')
{
    direc[0]=1;
    direc[1]=1;
    direc[2]=0;
    mode=0;
    Serial.println("45 Degrees XY plane");
}
if (ch=='X')
{
    direc[0]=0;
    direc[1]=0;
    direc[2]=0;
    mode=0;
    Serial.println("OFF");
}
// Platelet library //////////////////////////////////////////////////
if (ch=='4') //XY plane
{
    pVec[0]=0;
    pVec[1]=0;
    pVec[2]=1;
    mode=1;
    Serial.println("X-Y Plane");
}
if (ch=='5') //XZ plane
{
    pVec[0]=0;
    pVec[1]=1;
    pVec[2]=0;
    mode=1;
    Serial.println("X-Z Plane");
}
if (ch=='6') //YZ plane
{
    pVec[0]=1;
    pVec[1]=0;
    pVec[2]=0;
    mode=1;
    Serial.println("Y-Z Plane");
}
if (ch=='I')
{
    direc[0]=0;
    direc[1]=b;
    direc[2]=a;
    mode=1;
    Serial.println("B-C Plane");
}
if (ch=='J')
{
    direc[0]=d;
    direc[1]=c;
    direc[2]=a;
    mode=1;
    Serial.println("A-C Plane");
}
if (ch=='K')
{
    direc[0]=-d;
    direc[1]=c;
    direc[2]=a;
```
```
    mode=1;
    Serial.println("A-B Plane");
}
}
```

Setup, Loop and Interpret Functions for Integrated Printer Control of Solenoids

```
void setup( )
{
    for(i=0;i<=2;i++)
    {
        pinMode(H1[i], OUTPUT);
        pinMode(H2[i], OUTPUT);
        pinMode(L1[i], OUTPUT);
        pinMode(L2[i], OUTPUT);
    }
    byte pulsePin; //change to whatever input pin is used
    Serial.begin(9600);
}
void loop( )
{
    pulseLength = pulseIn(pulsePin, HIGH); //0-2000 microseconds
    pwmValue = 0.1258 * pulseLength + 0.2863;
    // Interpret the pwmValue if it is different from the previous
    pwmValue
    if (pwmValue<lowError || pwmValue>highError)
    {
        interpret( );
        n=0;
        Serial.println(pwmValue);
        highError=pwmValue+5;
        lowError=pwmValue-5;
    }
    // If the alignment direction has been updated, power solenoids
    if (n==0)
    {
        n=1;
        // If system is in fiber mode
        if (mode==0)
        {
            normalize( );
            convert(direc);
            maximum( );
            power( );
        }
        // If system is in platelet mode
        if (mode==1)
        {
            platelets( );
            convert(pD2);
            maximum( );
            power( );
            delay(switchTime);
            b=1;
        }
    }
    // If system is in Platelet mode, alternate between normal pulsing
    vectors in intervals of switchTime
    if (mode==1)
    {
        if (b=1)
        {
            convert(pD1);
            maximum( );
            power( );
            Serial.println("90 degrees");
            delay(switchTime);
            b=2;
        }
        if (b=2)
        {
            convert(pD2);
            maximum( );
            power( );
```

```
                Serial.println("0 degrees");
                delay(switchTime);
                b=1;
            }
        }
    }
    // Compares PWM value with library
    // Assigns alignment direction
    // Assigns alignment type (Platelets: mode=1, Fibers: mode=0;)
    void interpret( )
    {
        if (-30<=pwmValue && pwmValue<5)
        {
            direc[0]=0;
            direc[1]=0;
            direc[2]=0;
            mode=0;
            Serial.println("OFF");
        }
        // Fiber library
        if (A-5<pwmValue && pwmValue<A+5)
        {
            direc[0]=0;
            direc[1]=b;
            direc[2]=a;
            mode=0;
            Serial.println("Solenoid A");
        }
        if (Ar-5<pwmValue && pwmValue<Ar+5)
        {
            direc[0]=0;
            direc[1]=-b;
            direc[2]=-a;
            mode=0;
            Serial.println("Solenoid A Reverse");
        }
        if (B-5<pwmValue && pwmValue<B+5)
        {
            direc[0]=d;
            direc[1]=c;
            direc[2]=a;
            mode=0;
            Serial.println("Solenoid B");
        }
        if (C-5<pwmValue && pwmValue<C+5)
        {
            direc[0]=-d;
            direc[1]=c;
            direc[2]=a;
            mode=0;
            Serial.println("Solenoid C");
        }
        if (X-5<pwmValue && pwmValue<X+5)
        {
            direc[0]=1;
            direc[1]=0;
            direc[2]=0;
            mode=0;
            Serial.println("X Direction");
        }
        if (Y-5<pwmValue && pwmValue<Y+5)
        {
            direc[0]=0;
            direc[1]=1;
            direc[2]=0;
            mode=0;
            Serial.println("Y Direction");
        }
        if (Z-5<pwmValue && pwmValue<Z+5)
        {
            direc[0]=0;
            direc[1]=0;
            direc[2]=1;
            mode=0;
            Serial.println("Z Direction");
        }
        // Platelet library
        if (XY-5<pwmValue && pwmValue<XY+5) //XY plane
        {
            pVec[0]=0;
            pVec[1]=0;
            pVec[2]=1;
            mode=1;
            Serial.println("XY Plane");
        }
        if (XZ-5<pwmValue && pwmValue<XZ+5) //XZ plane
        {
            pVec[0]=0;
            pVec[1]=1;
            pVec[2]=0;
            mode=1;
            Serial.println("XZ Plane");
        }
        if (YZ-5<pwmValue && pwmValue<YZ+5) //YZ plane
        {
            pVec[0]=1;
            pVec[1]=0;
            pVec[2]=0;
            mode=1;
            Serial.println("YZ Plane");
        }
    }
```

Function Library: Mono

```
    // Converts direc to unit vector
    float normalize( )
    {
        float nfact=sqrt(pow(direc[0],2)+pow(direc[1],2)+pow(direc[2],2));
        direc[0]=direc[0]/nfact;
        direc[1]=direc[1]/nfact;
        direc[2]=direc[2]/nfact;
    }
    // Sets highest powered solenoid to max power, and adjusts other sole-
    noids
    proportionally
    // Maximizes field strength for alignment direction
    void maximum( )
    {
        float maxi=percent[0];
        for (i=1;i<=2;i++)
        {
            if (percent[i]>maxi)
            {
                maxi=percent[i];
            }
        }
        for (i=0;i<=2;i++)
        {
            percent[i]=percent[i]/maxi;
        }
    }
    // Converts power percentage to pwm output value
    // Powers solenoids
    void power( )
    {
        for(i=0;i<rows;i++)
        {
            pwm[i]=round(percent[i]*pctPWM); //rounds to nearest pwm
            value
        }
        for(i=0;i<=2;i++)
        {
            if(percent[i]<0)
            {
                digitalWrite(L1[i],LOW);
                analogWrite(H1[i],0);
                digitalWrite(L2[i],HIGH);
                analogWrite(H2[i],abs(pwm[i]));
            }
            else
            {
                digitalWrite(L2[i],LOW);
                analogWrite(H2[i],0);
                digitalWrite(L1[i],HIGH);
                analogWrite(H1[i],abs(pwm[i]));
```

```
            }
            //Serial.println(pwm[i]);
        }
    }
}
// Input: alignment direction (direc, pD1 or pD2)
// Converts alignment direction to power percentage for each solenoid
void convert(float A[3])
{
    for(i=0; i<rows; i++)
    {
        percent[i]=0;
        for(int k=0; k<rows; k++)
        {
            percent[i]=percent[i]+sol[i][k]*A[k];
        }
    }
}
```

Function Library: Platelets

```
// Establishes pulsing vectors for platelet alignment
// Sets pD1 and pD2 globally
void platelets( )
{
    Serial.println("Platelets");
    xp1( );
    xp2( );
    normalizeP( );
}
// Sets direction of pD1 based off pVec and random vector
float xp1( ) //sets direction of pD1
{
    pD1[0]=pVec[1]*randV[2]-pVec[2]*randV[1];
    pD1[1]=-(pVec[0]*randV[2]-pVec[2]*randV[0]);
    pD1[2]=pVec[0]*randV[1]-pVec[1]*randV[0];
}
// Sets direction of pD2 based off pVec and pD1
float xp2( ) //pD2 based off pD1
{
    pD2[0]=pVec[1]*pD1[2]-pVec[2]*pD1[1];
    pD2[1]=-(pVec[0]*pD1[2]-pVec[2]*pD1[0]);
    pD2[2]=pVec[0]*pD1[1]-pVec[1]*pD1[0];
}
// Converts pD1 & pD2 to unit vectors
float normalizeP( )
{
    float n1fact=sqrt(pow(pD1[0],2)+pow(pD1[1],2)+pow(pD1[2],2));
    pD1[0]=pD1[0]/n1fact;
    pD1[1]=pD1[1]/n1fact;
    pD1[2]=pD1[2]/n1fact;
    float n2fact=sqrt(pow(pD2[0],2)+pow(pD2[1],2)+pow(pD2[2],2));
    pD2[0]=pD2[0]/n2fact;
    pD2[1]=pD2[1]/n2fact;
    pD2[2]=pD2[2]/n2fact;
}
```

What is claimed is:

1. An apparatus for producing a composite part, comprising:
- a print head comprising a support block, a dispensing tip having an outlet, the dispensing tip supported on the support block with the outlet of dispensing tip disposed to dispense material to a print location below the support block, and a magnetic assembly supported on the support block, the magnetic assembly controllable to apply a magnetic field in a desired magnetic field direction and having a desired magnetic field strength at the print location adjacent to and directly below the outlet of the dispensing tip;
- a pump in fluid communication with the dispensing tip to provide a magnetically responsive precursor material to the dispensing tip;
- a bed disposed below the outlet of the dispensing tip to receive the magnetically responsive precursor material at the print location, the print head and the bed movable in three dimensions relative to each other; and
- one or more processors and memory, and machine-readable instructions stored in the memory that, upon execution by the one or more processors, cause the apparatus to carry out operations comprising controlling the magnetic assembly to apply the magnetic field in the desired direction and with the desired strength at the print location.

2. The apparatus of claim 1, wherein the magnetic assembly comprises three mutually orthogonally arranged solenoid magnets having a point of origin at the print location, and the processor is operative to execute instructions to control a magnitude and polarity of current through each solenoid magnet to apply the magnetic field in the desired direction and with the desired strength.

3. The apparatus of claim 2, wherein each solenoid magnet has a core with a central neutral axis and includes a central material with a first magnetic permeability aligned on the neutral axis and a spacer material with a second magnetic permeability less than the first magnetic permeability coaxially surrounding the central material.

4. The apparatus of claim 2, wherein each solenoid magnet includes a core, and a material with a magnetic permeability is disposed in the core and extends above, below, or above and below solenoid end faces.

5. The apparatus of claim 2, wherein each solenoid forms a bridge of a circuit in electrical communication with a DC power supply.

6. The apparatus of claim 5, wherein the processor is operative to execute instructions to subject the circuit to pulse width modulation to control current flow through the solenoid.

7. The apparatus of claim 5, wherein the processor is operative to execute instructions to switch the circuit to change the polarity of current flow through the solenoid.

8. The apparatus of claim 5, wherein the processor is operative to execute instructions to pulse current through the solenoids to apply magnetic fields with two alternating perpendicular field directions at the print location.

9. The apparatus of claim 1, wherein the processor is operative to execute instructions to provide a rotating magnetic field at the print location.

10. The apparatus of claim 1, wherein the processor is operative to control the magnetic assembly, the pump, and the motion of the bed relative to the print head based on a viscosity of the precursor material.

11. The apparatus of claim 1, wherein the processor is operative to control the magnetic assembly, the pump, and the motion of the bed relative to the print head to cause the magnetically responsive precursor material to align with the magnetic field within an alignment zone, and to allow the precursor material to cure sufficiently to maintain the magnetically responsive precursor material in alignment outside of the alignment zone.

12. The apparatus of claim 1, wherein the processor is operative to execute instructions to control a flow rate of the pump, to start the pump, and to stop the pump.

13. The apparatus of claim 1, further comprising cooling channels in the print head disposed to circulate a cooling fluid about the magnetic assembly.

14. The apparatus of claim 1, wherein the pump comprises a syringe pump.

15. The apparatus of claim 1, wherein the pump includes an inlet in fluid communication with one or more precursor material sources and an outlet, separate from the inlet, in fluid communication with the dispensing tip.

16. The apparatus of claim 1, further comprising a source of the magnetically responsive precursor material, wherein the magnetically responsive precursor material comprises a matrix material and magnetically responsive particles comprising at least in part a magnetic material.

17. A method for producing a composite part, comprising:

dispensing, through a dispensing tip supported on a print head and having an outlet disposed to dispense material to a print location below the support block, a precursor material onto a bed while moving the dispensing tip and the bed relative to each other, the precursor material comprising a matrix material and magnetically responsive particles, the magnetically responsive particles comprising at least in part a magnetic material;

applying, by a magnetic assembly supported on the print head, a magnetic field in a desired direction and having a desired strength at the print location adjacent to and directly below the outlet of the dispensing tip to align the magnetically responsive particles within an alignment zone on the bed;

allowing the precursor material to cure to maintain the magnetically responsive particles in an aligned position outside of the alignment zone.

18. The method of claim 17, further comprising controlling the steps of dispensing the precursor material and applying the magnetic field so that a viscosity of the precursor material while within the alignment zone remains sufficiently low to allow alignment of the magnetically responsive particles.

19. The method of claim 17, wherein applying the magnetic field comprises providing the magnetic assembly comprising three mutually orthogonally arranged solenoid magnets having a point of origin within the print location and controlling a magnitude and polarity of current through each solenoid to apply the magnetic field in the desired direction and with the desired strength.

20. The method of claim 17, further comprising selecting a viscosity of the precursor material, a speed of the dispensing tip relative to the bed, and a magnetic field strength to allow the magnetically responsive particles to align within the alignment zone and the precursor material to cure sufficiently to retain the magnetically responsive particles in an aligned position outside of the alignment zone.

* * * * *